US008660904B2

(12) United States Patent
Koegler et al.

(10) Patent No.: US 8,660,904 B2
(45) Date of Patent: Feb. 25, 2014

(54) ARCHITECTURAL DESIGN FOR SERVICE REQUEST AND ORDER MANAGEMENT APPLICATION SOFTWARE

(75) Inventors: Alexander Koegler, Walldorf (DE); Joachim Barnbeck, Heidelberg (DE); Steffen Hartig, Nussloch (DE); Hamid Moghaddam, Osterburken (DE); Berthold Wocher, Gaiberg (DE); Peter Meuer, Neckargemuend (DE); Christian Haas, Heidelberg (DE); Olivier M. Dreidemy, Holving (FR); Sebastian Pulkowski, St. Leon-Rot (DE); Matthias Schwarz, Mannheim (DE); Attila Orban, Blieskastel-Blickweiler (DE); Sabine Montnacher, Goettelborn (DE); Stephan Hetzer, Oestringen-Eichelberg (DE); Jochen Wickel, Wiesloch (DE); Jochen Hirth, Birkenau (DE); Daniel Bock, Heidelberg (DE); Uwe Mayer, Erligheim (DE); Jens Freund, Heidelberg (DE); Stefan Kaetker, Dossenheim (DE); Peter Latocha, Malsch (DE); Gerd Moosmann, Pforzheim (DE)

(73) Assignee: SAP AG, Walldorf (DE)

( * ) Notice: Subject to any disclaimer, the term of this patent is extended or adjusted under 35 U.S.C. 154(b) by 1842 days.

(21) Appl. No.: 11/322,610

(22) Filed: Dec. 30, 2005

(65) Prior Publication Data

US 2007/0156476 A1 Jul. 5, 2007

(51) Int. Cl.
*G06Q 30/00* (2006.01)
(52) U.S. Cl.
USPC .......................................................... 705/26.1

(58) Field of Classification Search
USPC ............................................ 705/26, 27, 26.1
See application file for complete search history.

(56) References Cited

U.S. PATENT DOCUMENTS

| 4,947,321 A | 8/1990 | Spence et al. |
| 5,550,734 A | 8/1996 | Tarter et al. |

(Continued)

FOREIGN PATENT DOCUMENTS

| WO | 00/23874 | 4/2000 |
| WO | WO 2004/083984 | 9/2004 |
| WO | WO 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

(Continued)

*Primary Examiner* — Mila Airapetian
(74) *Attorney, Agent, or Firm* — Fish & Richardson P.C.

(57) ABSTRACT

Methods, systems, and apparatus, including computer program products, for implementing a software architecture design for a software application implementing service request and order management. The application is structured as multiple process components interacting with each other through service interfaces, and multiple service interface operations, each being implemented for a respective process component. The process components include an Outbound Delivery process component, a Site Logistics Processing process component, a Confirmation and Inventory process component, a Customer Requirement Processing process component, a Supply and Demand Matching process component, a Logistics Execution Control process component, a Service Request Processing process component, a Customer Quote Processing process component, a Service Order Processing process component, a Service Contract process component, and a Service Confirmation Processing process component.

20 Claims, 27 Drawing Sheets

(56) References Cited

U.S. PATENT DOCUMENTS

| | | |
|---|---|---|
| 5,560,005 A | 9/1996 | Hoover et al. |
| 5,586,312 A | 12/1996 | Johnson et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,768,119 A | 6/1998 | Havekost et al. |
| 5,822,585 A | 10/1998 | Nobel et al. |
| 5,832,218 A | 11/1998 | Gibbs et al. |
| 5,848,291 A | 12/1998 | Milne et al. |
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |
| H001830 H | 1/2000 | Petrimoulx et al. |
| 6,028,997 A | 2/2000 | Leymann et al. |
| 6,049,838 A | 4/2000 | Miller et al. |
| 6,070,197 A | 5/2000 | Cobb et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,208,345 B1 | 3/2001 | Sheard et al. |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Costanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,671,673 B1 | 12/2003 | Baseman et al. |
| 6,678,882 B1 | 1/2004 | Hurley et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,764,009 B2 | 7/2004 | Melick et al. |
| 6,789,252 B1 | 9/2004 | Burke et al. |
| 6,847,854 B2 | 1/2005 | Discenzo |
| 6,889,197 B2 | 5/2005 | Lidow |
| 6,889,375 B1 | 5/2005 | Chan et al. |
| 6,895,438 B1 | 5/2005 | Ulrich |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 * | 8/2008 | Goel ................................ 705/26 |
| 7,418,424 B2 | 8/2008 | Martin et al. |
| 7,448,022 B1 | 11/2008 | Ram et al. |
| 7,451,432 B2 | 11/2008 | Shukla et al. |
| 7,461,030 B2 | 12/2008 | Hibler et al. |
| 7,469,233 B2 | 12/2008 | Shooks et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,739,160 B1 | 6/2010 | Ryan et al. |
| 7,742,985 B1 | 6/2010 | Digrigoli et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,904,350 B2 | 3/2011 | Ayala et al. |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0082892 A1 | 6/2002 | Raffel et al. |
| 2002/0103660 A1 | 8/2002 | Cramon et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |

(56) References Cited

U.S. PATENT DOCUMENTS

| | | |
|---|---|---|
| 2003/0212602 A1 | 11/2003 | Schaller |
| 2003/0233290 A1 | 12/2003 | Yang et al. |
| 2004/0034578 A1 | 2/2004 | Oney et al. |
| 2004/0111304 A1 | 6/2004 | Meka et al. |
| 2004/0128180 A1 | 7/2004 | Abel et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0156430 A1 | 7/2007 | Kaetker et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |

OTHER PUBLICATIONS

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

(56) References Cited

OTHER PUBLICATIONS

Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009;28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.

(56) References Cited

OTHER PUBLICATIONS

Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP__mySAP__ERP__2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ Human Capital Management"; Downloaded Mar. 24, 2010 from <http://web.archive.org/web/20060105084834/www.sap.com/solutions/business-suite/erp/hcm/pdf/HCM__Time__Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Office Action issued in U.S. Appl. No. 11/322,398 on Apr. 2, 2010; 39 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 11/967,865 on Mar. 31, 2010; 16 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.
Office Action issued in U.S. Appl. No. 11/396,312 on Sep. 10, 2010; 23 pages.
Office Action issued in U.S. Appl. No. 11/322,772; Jul. 12, 2010; 18 pages.
Notice of Allowance issued in U.S. Appl. No. 11/322,398 on Jul. 23, 2010; 38 pages.
Advisory Action issued in U.S. Appl. No. 11/323,041 on Jun. 7, 2010; 3 pages.
Notice of Allowance issued in U.S. Appl. No. 11/396,259 on Jul. 6, 2010; 6 pages.

(56) References Cited

OTHER PUBLICATIONS

Notice of Allowance issued in U.S. Appl. No. 11/396,258 on Jul. 28, 2010; 9 pages.
Office Action issued in U.S. Appl. No. 11/322,845; Jul. 15, 2010; 16 pages.
Advisory Action issued in U.S. Appl. No. 11/322,612; Jun. 24, 2010; 3 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/968,054 on Sep. 7, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/967,483; Aug. 20, 2010; 10 pages.
SAP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/322,611 on Sep. 16, 2010; 21 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 1/322,382 on Sep. 20, 2010; 6 pages.
Notice of Allowance issued in U.S. Appl. No. 11/396,259 on Oct. 15, 2010; 6 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Office Action issued in U.S. Appl. No. 12/233,557 on Sep. 16, 2010; 16 pages.
Notice of Allowance issued in U.S. Appl. No. 12/233,534 on Oct. 20, 2010; 15 pages.
Notice of Allowance issued in U.S. Appl. No. 12/327,354 on Oct. 18, 2010; 16 pages.
Notice of Allowance issued in U.S. Appl. No. 11/967,865 on Oct. 6, 2010; 6 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Notice of Allowance issued in U.S. Appl. No. 12/333,085; Sep. 13, 2010; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages. [online] http://www.lionbridge.com/NR/rdonlyres/4940BE1F/DA46/412E/AB16/F049BD865CA1/0/PBMWFAQ_50070686_en.pdf.
Notice of Allowance issued in U.S. Appl. No. 1/322,382 on Jan. 6, 2011; 7 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,250 on Mar. 2, 2011; 13 pages.
Notice of Allowance issued in U.S. Appl. No. 11/322,845; Dec. 27, 2010; 16 pages.
Notice of Allowance issued in U.S. Appl. No. 11/397,026 on Mar. 3, 2011; 6 pages.
Notice of Allowance issued in U.S. Appl. No. 12/233,554 on Feb. 22, 2011; 7 pages.
Office Action issued in U.S. Appl. No. 12/233,550 on Jan. 12, 2011; 29 pages.
Office Action issued in U.S. Appl. No. 12/233,557 on Mar. 4, 2011; 19 pages.
Notice of Allowance issued in U.S. Appl. No. 12/233,534 on Jan. 31, 2011; 15 pages.
Notice of Allowance issued in U.S. Appl. No. 12/327,354 on Feb. 1, 2011; 16 pages.
Notice of Allowance issued in U.S. Appl. No. 11/396,327 on Nov. 30, 2010; 28 pages.
Notice of Allowance issued in U.S. Appl. No. 12/233,462 on Feb. 2, 2011; 11 pages.
Office Action issued in U.S. Appl. No. 11/967, 483 on Mar. 4, 2011; 6 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 11/323,634 on Apr. 29, 2011; 8 pages.
Office Action issued in U.S. Appl. No. 11/322,973 on May 27, 2011; 15 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/233,534 on May 16, 2011; 12 pages.

(56) References Cited

OTHER PUBLICATIONS

Notice of Allowanced issued in U.S. Appl. No. 11/322,398 on May 27, 2011; 21 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,845; Apr. 8, 2011; 8 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 11/967,865 on Jun. 24, 2011; 8 pages.

\* cited by examiner

ARCHITECTURAL DESIGN FOR SERVICE REQUEST AND ORDER MANAGEMENT APPLICATION SOFTWARE

BACKGROUND

The subject matter of this patent application relates to computer software architecture, and more particularly to the architecture of application software for service request and order management.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application.

Methods, systems, and apparatus, including computer program products, for implementing a software architecture design for a software application implementing service request and order management. The application is structured as multiple process components interacting with each other through service interfaces, and multiple service interface operations, each being implemented for a respective process component. The process components include an Outbound Delivery process component, a Site Logistics Processing process component, a Confirmation and Inventory process component, a Customer Requirement Processing process component, a Supply and Demand Matching process component, a Logistics Execution Control process component, a Service Request Processing process component, a Customer Quote Processing process component, a Service Order Processing process component, a Service Contract process component, and a Service Confirmation Processing process component.

The invention can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
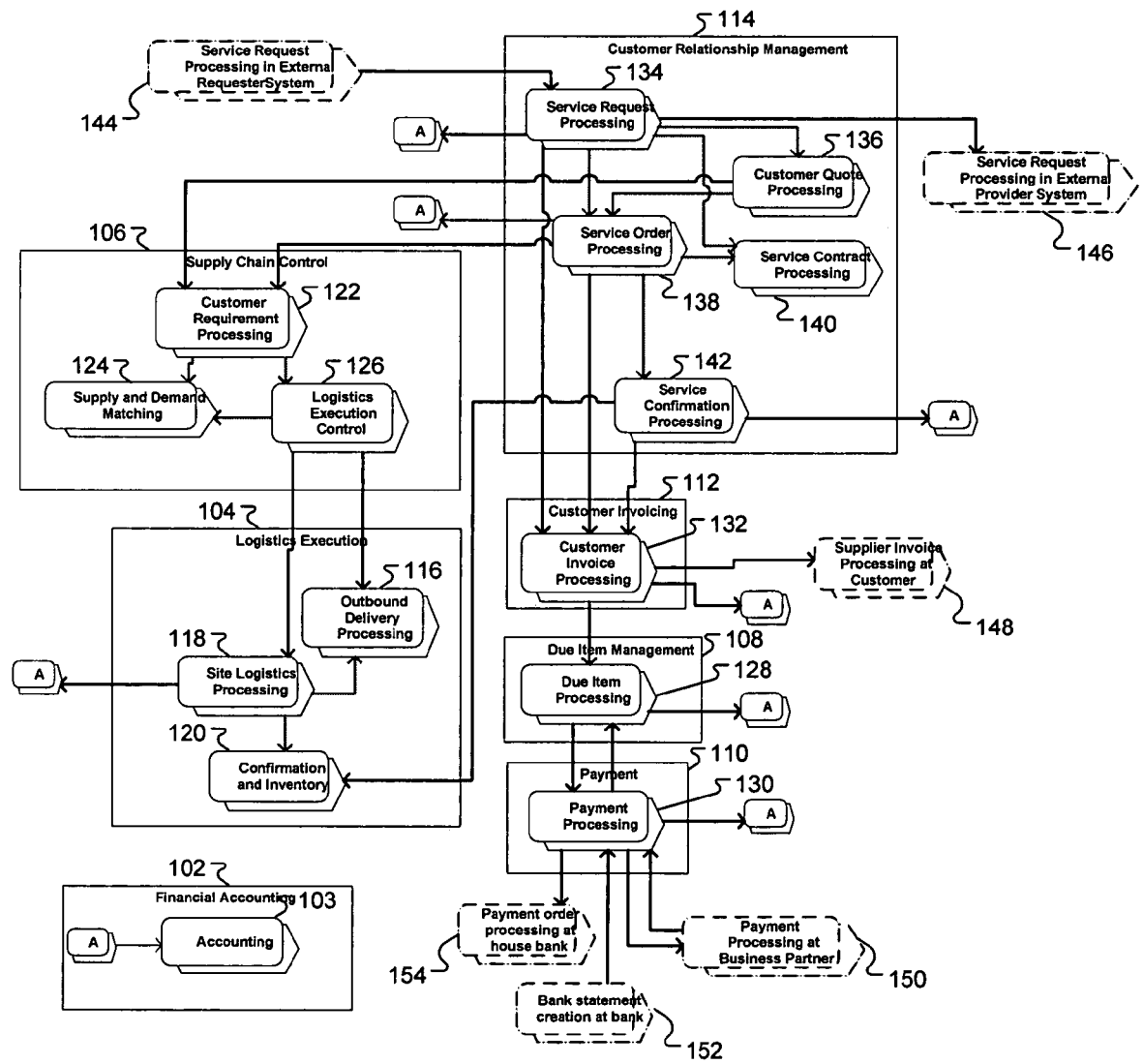
FIG. 1 is a block diagram of a software architectural design for service request and order management software application.

FIG. 1 shows the software architectural design for a Service Request and Order Management software application. The Service Request and Order Management application is software that implements Describes operational processes in a customer service and support center based on Service Requests, Service Orders and Service Confirmations including their integration into related applications such as invoicing, financial accounting and logistics.

As shown in FIG. 1, the Service Request and Order Management design includes seven deployment units: a Financial Accounting deployment unit 102, a Logistics Execution deployment unit 104, a Supply Chain Control deployment unit 106, a Due Item Management deployment unit 108, a Payment deployment unit 110, a Customer Invoicing deployment unit 112, and a Customer Relationship Management deployment unit 114.

The Financial Accounting deployment unit contains an Accounting process component 103 that records all relevant business transactions.

The Logistics Execution deployment unit 104 includes three process components: an Outbound Delivery process component 116, a Site Logistics Processing process component 118, and a Confirmation and Inventory process component 120.

The Outbound Delivery process component 116 combines tasks concerning outbound delivery processes and enables communication with a vendor and a process component within the Invoice deployment unit. For example, the Outbound Delivery process component 116 may prepare and trigger execution of physical operations associated with an invoice.

The Site Logistics Processing process component 118 supports all preparation and execution tasks concerning internal inventory movement in a warehouse type environment.

The Site Logistics Processing process component 118 may provide stock information such as special stock items. Exception and alert information may also be provided by the Site Logistics Processing process component 118.

The Confirmation and Inventory process component 120 combines all tasks required to confirm inventory changes and provided activities. The Confirmation and Inventory process component 120 may provide services to maintain current stock, handling unit content, logistics operating unit content and allocation content.

The Supply Chain Control deployment unit 106 includes three process components: a Customer Requirement Processing process component 122, a Supply and Demand Matching process component 124, and a Logistics Execution Control process component 126.

The Customer Requirement Processing process component 122 combines the tasks required for processing customer requirements and provides an interface to presales, sales and services. The Customer Requirement Processing process component 122 receives the customer requirements, prepares them and passes them on to the Supply and Demand Matching process component 124 as supply planning requirements.

The Supply and Demand Matching process component 124 combines all the tasks necessary to ensure that sufficient material receipt elements exist to cover material demand while taking available capacity into account. For example, the supply and demand matching process component 124 may collect all the various material demands from customer requirement processing, the in-house requirement processing, the demand forecast processing, and the sales scheduling agreement processing and attempt to assign all the existing material receipts. The matching component may also plan the internal or external procurement of further material receipts where necessary.

The Logistics Execution Control process component 126 controls and monitors the supply chain execution activities necessary for the fulfillment of an order. For example, sales order activities or purchase order activities may be controlled and monitored by the logistics execution control process component. The Logistics Execution Control process component 126 sends information to the logistics execution to trigger the necessary supply chain execution activities, receives information about the supply chain execution progress, and updates data relevant for both fulfillment and supply and demand planning.

The Due Item Management deployment unit 108 includes a Due Item Processing process component 128. The Due Item Processing process component 128 is used to manage all payables, receivables from service and supply and corresponding sales including a withholding tax.

The Payment deployment unit 110 includes a Payment Processing process component 130. The Payment Processing process component 130 is used to handle all incoming and outgoing payments as well as represent the main database for a liquidity status.

The Customer Invoice deployment unit 112 includes a Customer Invoice Processing process component 132 used to charge a customer for the delivery of goods or services.

The Customer Relationship Management deployment unit 114 includes five process components: a Service Request Processing process component 134, a Customer Quote Processing process component 136, a Service Order Processing process component 138, a Service Contract process component 140, and a Service Confirmation Processing process component 142.

The Service Request Processing process component 134 covers requests from a customer to a service provider to answer a question or solve a problem about a product that the customer possesses. The goal is to solve this problem as quickly as possible, for example, solving the problem on the phone by a service desk agent with the help of a knowledge base.

The Customer Quote Processing process component 136 is used to offer to a customer for the delivery of goods or services according to fixed terms. The offer legally binds the company for a certain period of time.

The Service Order Processing process component 138 deals with short-term agreements between a customer and a service provider, in which the customer orders one-off services. For example, an order could be to maintain or repair some equipment making it necessary to send a technician along with spare parts. Typically, these services are billed services. The service order is also used to schedule resources and plan availability of spare parts, and can include extra expenses required to execute service jobs (for example, travel expenses).

The Service Contract Processing process component 140 deals with long-term agreements between a customer and a service provider, specifying the scope of services and general conditions (for example, service levels and prices) used for processing service requests and service orders.

The Service Confirmation Processing process component 142 is used to deal with services rendered for a service order. This includes reporting back working times, materials used, as well as any expenses incurred during the service activities. These particulars are used as a basis for keeping track of working times, updating stock levels for spare parts, processing invoices, and cost accounting.

A number of external process components, described below, will be used to describe the architectural design. These include a Service Request Processing in External Requester System process component 144, a Service Request Processing in External Provider System process component 146, a Supplier Invoice Processing at Customer process component 148, a Payment Processing at Business Partner process component 150, a Bank statement creation at bank process component 152, and a Payment order processing at house bank process component 154.

Figure 2:
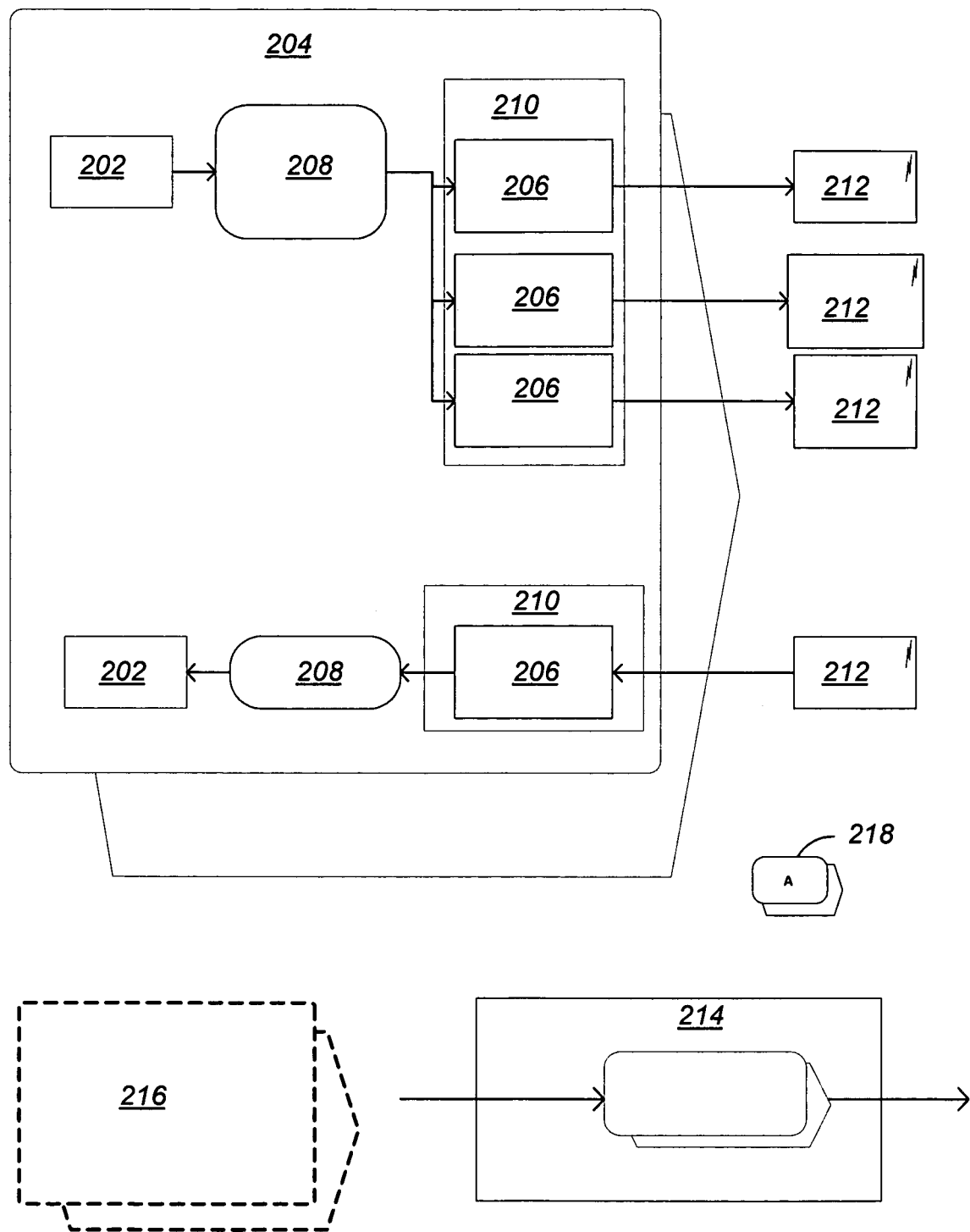
FIG. 2 illustrates the elements of the architecture as they are drawn in the figures of this patent application.

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are assigned to their respective deployment unit.

A process component of an external system is drawn as a dashed-line process component (drawn as icon 216). Such a process component may be referred to as an external process component, and it is used to represent the external system in describing interactions with the external system; however, this should be understood to require no more of the external system that it be able to produce and receive messages as required by the process component that interacts with the external system.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements also include the service interface, referred to simply as the interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Interactions between Process Components "Customer Quote Processing" and "Customer Requirement Processing"

Figure 3:
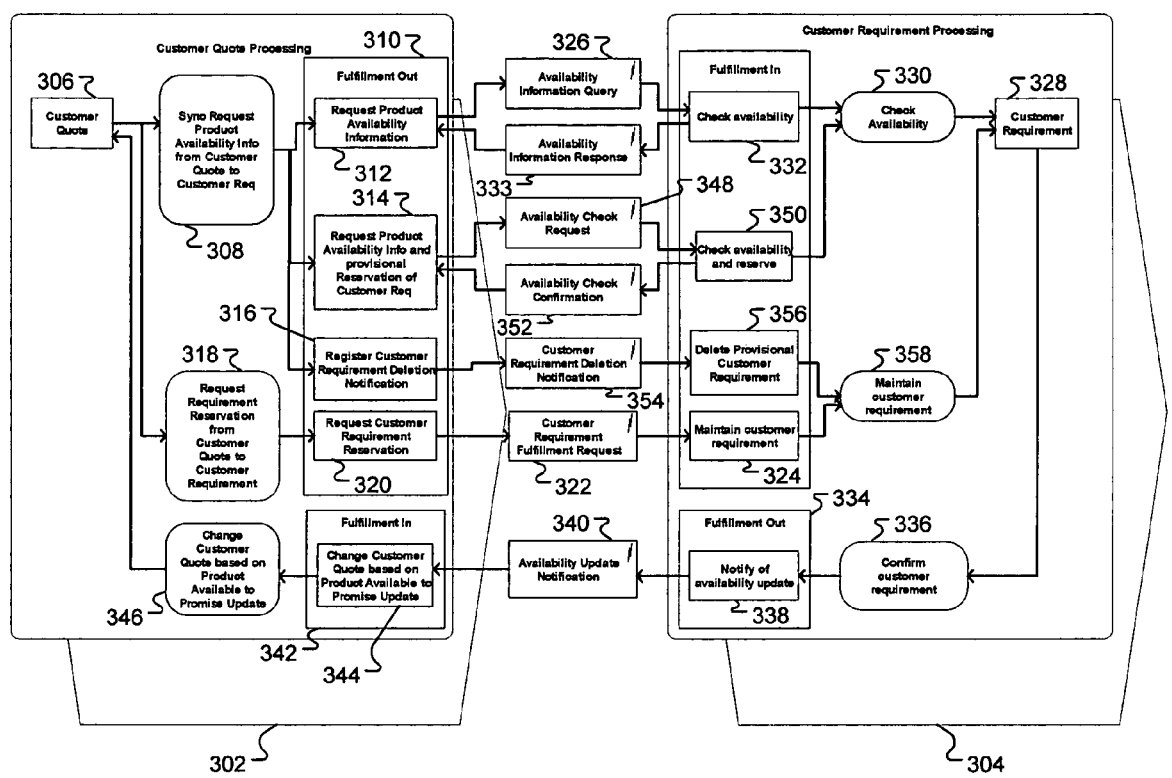
FIG. 3 is a block diagram showing interactions between a Customer Quote Processing process component and a Customer Requirement Processing process component.

FIG. 3 is a block diagram showing interactions between a Customer Quote Processing process component 302 and a Customer Requirement Processing process component 304 in the architectural design of FIG. 1.

The Customer Quote Processing process component 302 includes a Customer Quote business object 306. The Customer Quote business object 306 is a document containing an offer by a vendor to a customer for the delivery of goods or services according to fixed terms. The offer is legally binding for a specific period of time. The Customer Quote business object 306 uses a Synchronous Request Availability Information from the Customer Quote to Customer Requirements outbound process agent 308 to send update information into a Fulfillment Out interface 310.

The Fulfillment Out interface 310 may invoke one or more of three operations depending on the received data instructions: a synchronous Request Product Availability Information operation 312 to request availability information for customer quote items, a Request Product Availability Information and provisional Reservation operation 314 that requests availability information, including the creation of a provisional reservation for customer quote items, or a Register Customer Requirement Deletion Notification operation 316 that registers provisional requirement reservation for deletion and triggers deletion in case of failure or cancellation of transaction processing, In addition, a second outbound process agent 318 (Request Reservation from Customer Quote to Customer Requirement) may send update information to the Fulfillment Out interface 310, which may invoke a Request Customer Requirement Reservation operation 320 that requests fulfillment planning for customer quote items. A Customer Requirement Fulfillment Request message 322 may be sent to a Maintain Customer Requirement operation 324 in the Customer Requirement Processing process component 304.

If the Request Product Availability Information operation 312 is performed, then an Availability Information Query message 326 is generated and sent to the Customer Requirement Processing process component 304 where the update is sent on to a Customer Requirement business object 328 using a Check Availability outbound process agent 330. This update may be performed by a synchronous Check Availability operation 332. The Customer Requirement business object 328 is a requirement document that is derived from a sales order or quotation and to which details on the anticipated availability date are added. It may contain the quantities of required products at specific dates, and information about which products and quantities will be available or delivered at which dates. In addition to forwarding information to the Customer Requirement business object 328, the Check Availability operation 332 may send an Availability Information Response message 333 back to the Customer Quote Processing process component 304.

Upon receiving the update, the Customer Requirement business object 328 sends the update to a Fulfillment Out interface 334 using a Confirm Customer Requirement outbound process agent 336. The Fulfillment Out interface 334 invokes a Notify of availability update operation 338 that notifies the creator of a customer requirement about an updated availability situation for the products requested within the customer requirement. An Availability Update Notification message 340 is generated and sent into the Fulfillment In interface 342 in the Customer Quote process agent 302.

The Fulfillment In interface 302 may invoke a Change Customer Quote based on Availability Update operation 344 that changes customer quote with availability and reservation information based on changes in fulfillment planning. An inbound process agent 346 (Change Customer Quote based on Availability Update) may send update information to the Customer Quote business object 306.

If the Request Product Availability Information and Provisional Reservation operation 314 is performed, an Availability Check Request message 348 may be generated and sent to a Check availability and Reserve operation 350 that checks the availability of specific amounts of certain materials and confirms this availability to the caller in the Customer Requirement Processing process component 304. The message 348 may be sent on to the Customer Requirement business object 328 and an Availability Check Confirmation message 352 may be sent back to the Customer Quote Processing process component 302.

If the Register Customer Requirement Deletion Notification operation 316 is performed, a Customer Requirement Deletion Notification message 354 is generated and sent to a Delete Provisional Customer Requirement operation 356 that deletes provisional customer requirements that have been created by a sync check availability and reserve operation. The message 354 may be sent on to the Customer Requirement business object 328 using a Maintain Customer Requirement inbound process agent 358.

Interactions between Process Components "Service Request Processing" and "Customer Invoice Processing"

Figure 4:
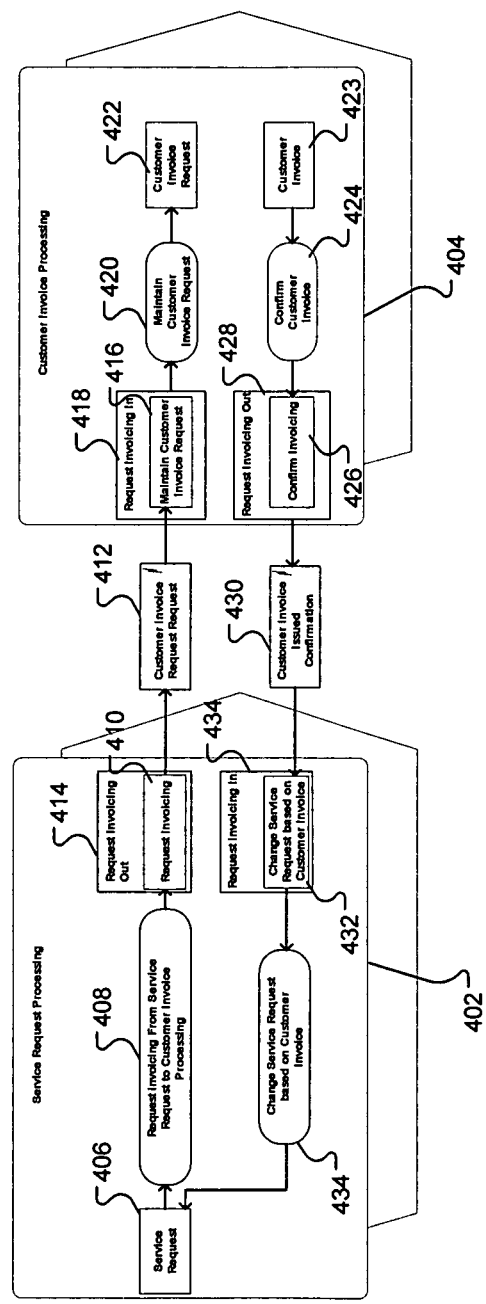
FIG. 4 is a block diagram showing interactions between a Service Request Processing process component and a Customer Invoice Processing process component.

FIG. 4 is a block diagram showing interactions between a Service Request Processing process component 402 and a Customer Invoice Processing process component 404 in the architectural design of FIG. 1.

The Purchase Request Processing process component 302 includes a Service Request business object 406. The Service Request business object 406 contains a service notification reflecting the initial inquiry of a customer when contacting a customer service and support center.

In the Service Request Processing process component 402, a Request Invoicing from Service Request to Customer Invoice Processing outbound process agent 408 requests the execution of a service request. The outbound process agent 408 uses a Request Invoicing operation 410 to send a Customer Invoice Request Request message 412 to the Customer Invoice Processing process component 404. The Request Invoicing operation 410 is part of a Request Invoicing Out interface 414.

The Customer Invoice Request Request message 412 is received by a Maintain Customer Invoice Request operation 416, which creates, updates, deletes or requests cancellation of customer invoice requests in a Request Invoicing In interface 418. The operation 416 initiates a Maintain Customer Invoice Request inbound process agent 420.

The Customer Invoice Processing process component 404 includes a Customer Invoice Request business object 422. The Customer Invoice Request business object 422 is used to charge a customer for delivery of goods or services.

The customer Invoice Processing process component 404 also includes a Customer Invoice business object 423. A Confirm Customer Invoice outbound process agent 424 requests the execution of a Confirm Invoicing operation 426 that confirms that a customer invoice was created (or cancelled) to process components which requested the invoicing. The outbound process agent 428 uses a Confirm Invoicing operation 426 to send a Customer Invoice Issued Confirmation message 430 to the Service Request Processing process component 402. The Confirm Invoicing operation 426 is part of a Request Invoicing Out interface 428.

The Customer Invoice Issued Confirmation message 430 is received by a Change Service Request based on Customer Invoice operation 432 that documents information about issued customer invoice in the service request in a Request Invoicing In interface 434. The operation 432 initiates a Change Service Request based on Customer Invoice inbound process agent 434. The inbound process agent 434 updates the Service Request business object 406.

Interactions between Process Components "Service Confirmation Processing" and "Customer Invoice Processing"

Figure 5:
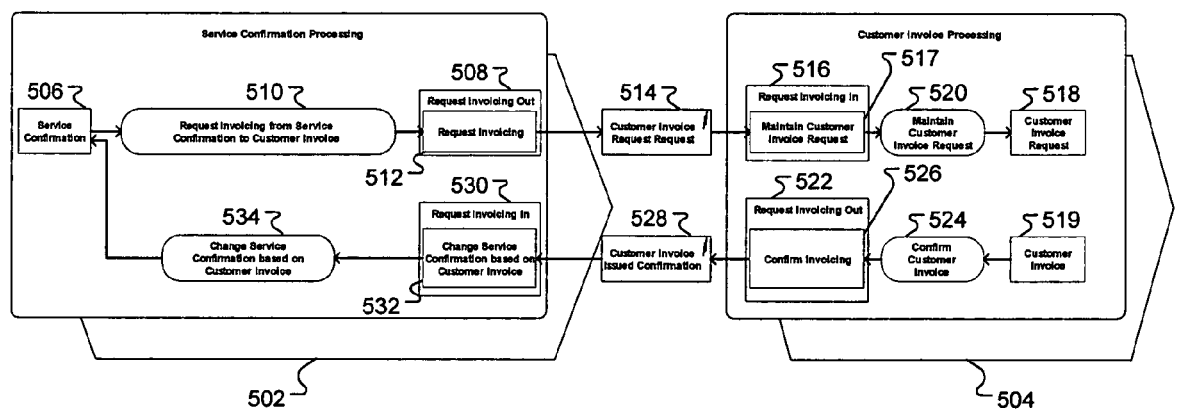
FIG. 5 is a block diagram showing interactions between a Service Confirmation Processing process component and a Customer Invoice Processing process component.

FIG. 5 is a block diagram showing interactions between a Service Confirmation Processing process component 502 and a Customer Invoice Processing process component 504 in the architectural design of FIG. 1. The Service Confirmation Processing process component 502 includes a Service Confirmation business object 506 that sends a request to a Request Invoice Out interface 508 using a Request Invoicing from Service Confirmation to Customer Invoice outbound process agent 510. The Request Invoicing Out interface 508 invokes a Request Invoicing operation 512 that Requests invoicing of services provided and spare parts consumed as reported back in the service confirmation as actual values. Next, a Customer Invoice Request Request message 514 is generated and sent to the Customer Invoice Processing process component 504 where it is received in a Request Invoicing In interface 516. A Maintain Customer Invoice Request 517 may then be invoked to create, update, delete or request a cancellation of customer invoice request. An update may be sent to a Customer Invoice Request business object 518 using a Maintain Customer Invoice Request inbound process agent 520. The Customer Invoice Processing process component 504 may include a Customer Invoice business object 519 is used to charge a customer for delivery of goods or services.

The Customer Invoice Processing process component 504 may send a confirmation into a Request Invoicing Out interface 522 using a Confirmation Customer Invoice outbound process agent 524. The Request Invoicing Out interface 522 may invoke a Confirm Invoicing operation 526 that confirms that customer invoice was created (or cancelled) to process components which requested invoicing. A Customer Invoice Issued Confirmation message 528 may then be generated and sent to the Request Invoicing In interface 530 in the Service Confirmation Processing process component 502. Next, a Change Service Confirmation based on Customer Invoice operation 532 is invoked to document information about issued customer invoice in the service confirmation. A Change Service Confirmation based on Customer Invoice inbound process agent 534 updates the Service Confirmation business object 506.

Interactions between Process Components "Service Request Processing" and "Service Request Processing in External Provider System"

Figure 6:
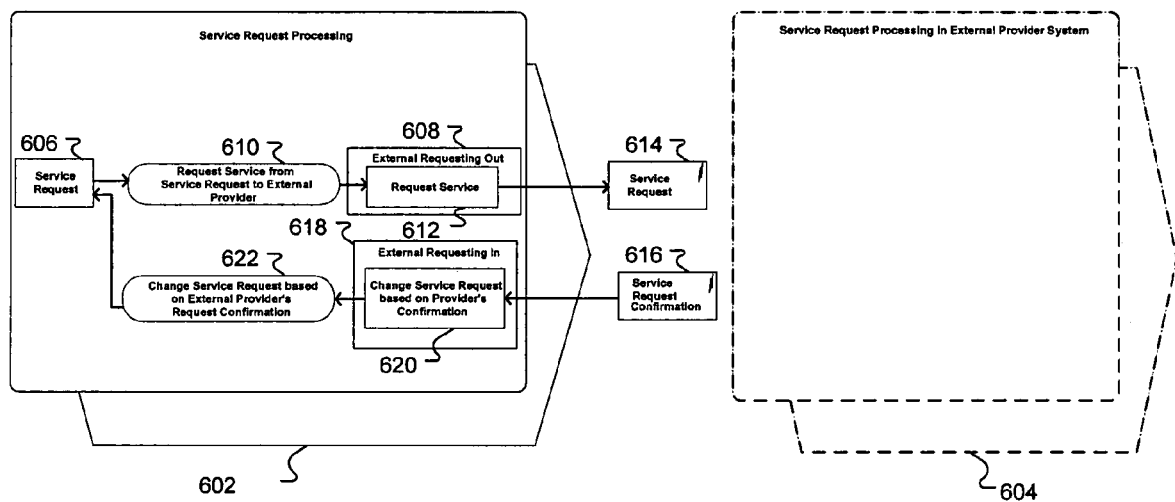
FIG. 6 is a block diagram showing interactions between a Service Request Processing process component and a Service Request Processing in External Provider System process component.

FIG. 6 is a block diagram showing interactions between a Service Request Processing process component 602 and a Service Request Processing in External Provider System process component 604 in the architectural design of FIG. 1.

The Service Request Processing process component 602 includes a Service Request business object 606. The Service Request business object 606 is a service notification reflecting the initial inquiry of a customer when contacting a Customer Service and Support Center. The Service Request business object 606 includes customer data, the nature of the request and the customer's product in question. In addition, text notes describing the issue and attributes that classify the request, the problem, reason, severity, and so on can be maintained. Service requests might also include immediate validation of existing service entitlements, such as agreed service levels and existing service contracts or product warranties. To ensure an appropriate reaction, prioritization and scheduling of request processing is set accordingly.

The Service Request business object 606 sends a request to an External Requesting Out interface 608 using a Request Service from Service Request to External Provider outbound process agent 610. The External Request Out interface 608 invokes a Request Service operation 612 that sends Service Request Creation/Update data to an external provider system, thereby generating a Service Request message 614 to update the Service Request Processing in External Provider System process component 604.

The Service Request Processing process component 602 may receive an incoming Service Request Confirmation message 616 from the Service Request Processing in External Provider System process component 604. An External Requesting In interface 618 receives the message 616 and invokes a Change Service Request based on Provider's Confirmation operation 620 that updates a service request based on a confirmation message of a service request creation, update or processing progress received from an external provider system. A Change service Request based on External Provider's Request Confirmation inbound process agent 622 updates the Service Request business object 606.

Interactions between Process Components "Logistics Execution Control" and "Site Logistics Processing"

Figure 7:
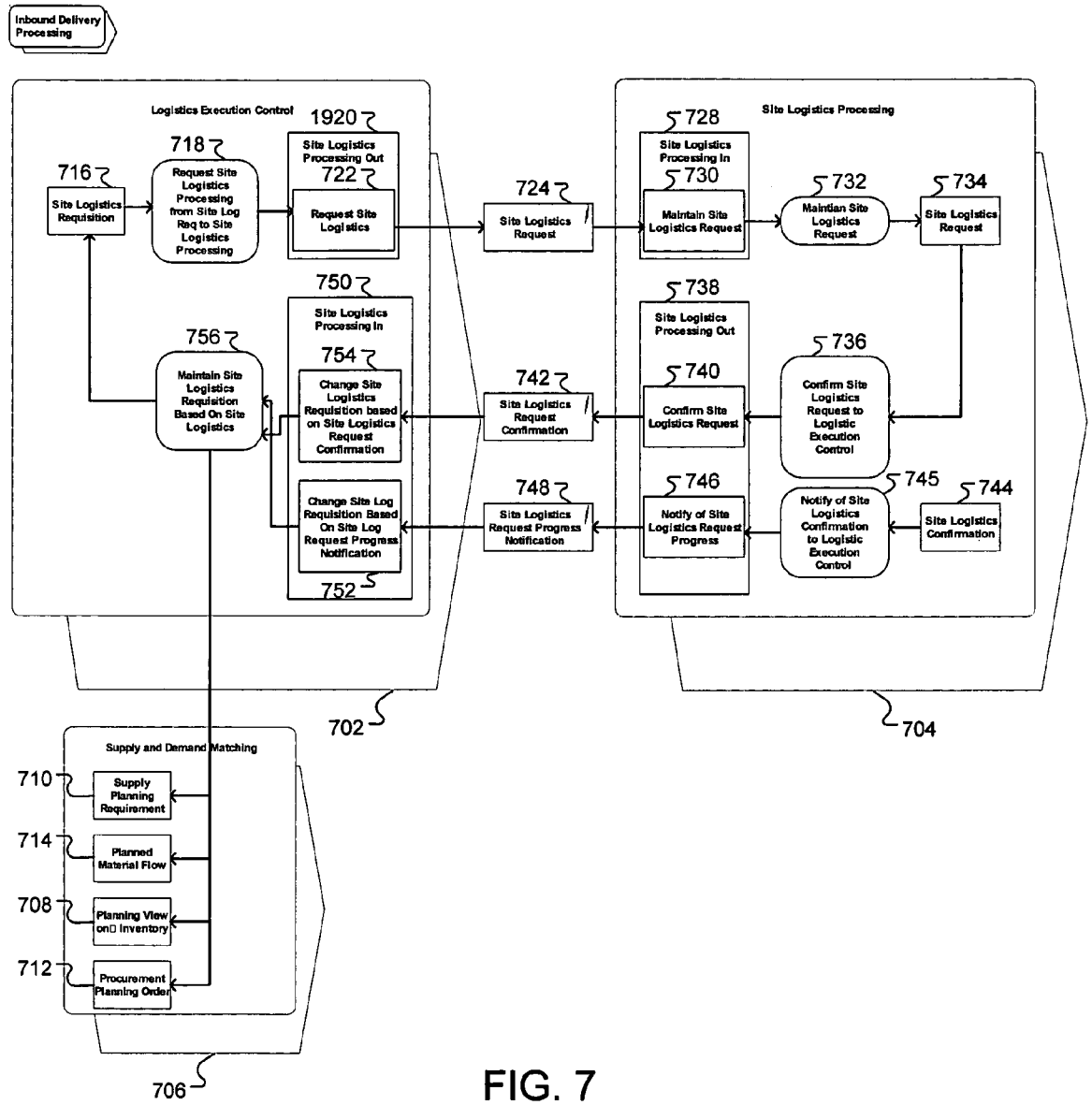
FIG. 7 is a block diagram showing interactions between a Logistics Execution Control process component and a Site Logistics Processing process component.

FIG. 7 is a block diagram showing interactions between a Logistics Execution Control process component 702 and a Site Logistics Processing process component 704 in the architectural design of FIG. 1

Four business objects from the Demand Matching process component 706 are used in the Logistics execution Demand process component 702: Planning View on Inventory 708, which is a planning view on Inventory is an object that represents the inventory object from logistics execution, Supply Planning Requirement 710, which is a requirement object that is used as the target for the supply planning run and the availability check, Procurement Planning Order 712, which defines the requested or expected material receipt in a specific quantity and at a specific availability date, Planned Material Flow 714, which is an object that defines the relationship between material receipt elements (stock, planned order, and a production order, purchase requisition, purchase order etc.) and material requirements elements (sales order, forecast demand, dependent demand, transfer demand) of a material within a location.

The business object 716 uses a Request Site Logistics Processing from Site Log Req to Site Logistics Processing outbound process agent 718 to send an update to the Request Site Logistics Processing process component 704.

The Site Logistics Processing Out interface 720 includes a Request Site Logistics operation 722 to send a request in order to maintain the site logistics request. The Site Logistics Request message 724 may then be generated and sent to the Site Logistics Processing process component 704.

The Site Logistics Processing In interface 728 includes a Maintain Site Logistics Request operation 730 that creates or updates a Site Logistics Processing Request. A Maintain Site Logistics Request inbound process agent 732 may send an update into a Site Logistics Request business object 734. The Site Logistics Request business object 734 performs Site Logistics operations supporting outbound, inbound and site internal logistics activities at a certain time. A Confirm Site Logistics Request to Logistic Execution Control outbound process agent 736 may send updated information into a Site Logistics Processing Out interface 738 which includes a Confirm Site Logistics Request operation 740 that confirms receipt of request and acknowledges quantities and delivery dates. This operation 740 generates a Site Logistics Request Confirmation message 742 which will be sent to update the Logistics Execution Control process component 702.

A Site Logistics Confirmation business object 744 may also send updated information into the Logistics Execution Control process component 702 using a Notify of Site Logistics Confirmation to Logistic Execution Control outbound process agent 745. The Site Logistics Confirmation business object 744 is a document that collects actual data posted with reference to a site logistics order or site logistics request. The site logistics confirmation updates inventory, finance and planning. A Notify of Site Logistics Request Progress operation 746 may be invoked that informs logistics execution control about inventory changes and fulfillment of Site Logistics Processing. A Site Logistics Request Progress Notification message 748 may be generated to update the Logistics Execution Control process component 702.

Upon receiving messages 740 and 742, the Logistics Execution Control process component 702 may perform the following operations: 1. The Site Logistics Processing In interface 750 contains a Change Site Log Request Progress Notification operation 752, which notifies Logistics execution control of inventory changes and confirmation of Site Logistics Processing. 2. The Site Logistics Processing In interface 750 also contains a Change Site Logistics Requisition based on Site Logistics Request Confirmation operation 754 that receives confirmation data from Site Logistics Request. A Maintain Site Logistics Requisition Based on Site Logistics inbound process agent 756 may then update the Site Logistics Requisition business object 716.

Interactions between Process Components "Payment Processing at Business Partner" and "Payment Processing"

Figure 8:
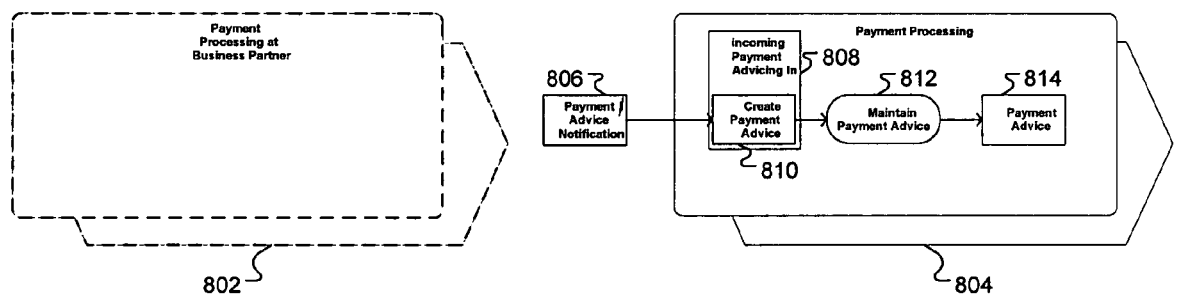
FIG. 8 is a block diagram showing interactions between a Payment Processing at Business Partner process component and a Payment Processing process component.

FIG. 8 is a block diagram showing interactions between a Payment Processing at Business Partner process component 802 and a Payment Processing process component 804 in the architectural design of FIG. 1.

A payment advice is created at a business partner and a Payment Advice Notification message 806 is generated. The Payment Processing process component 804 receives the Payment Advice Notification message 806 into the Incoming Payment Advicing In interface 808, where a Create Payment Advice operation 810 creates a Payment Advice concerning future payment transactions. A Maintain Payment Advice inbound process agent 812 updates a Payment Advice business object 814 with a new or modified payment advice. The payment advice may be sent to the Due Item Processing deployment unit for post processing.

Interactions between Process Components "Service Order Processing" and "Customer Invoice Processing"

Figure 9:
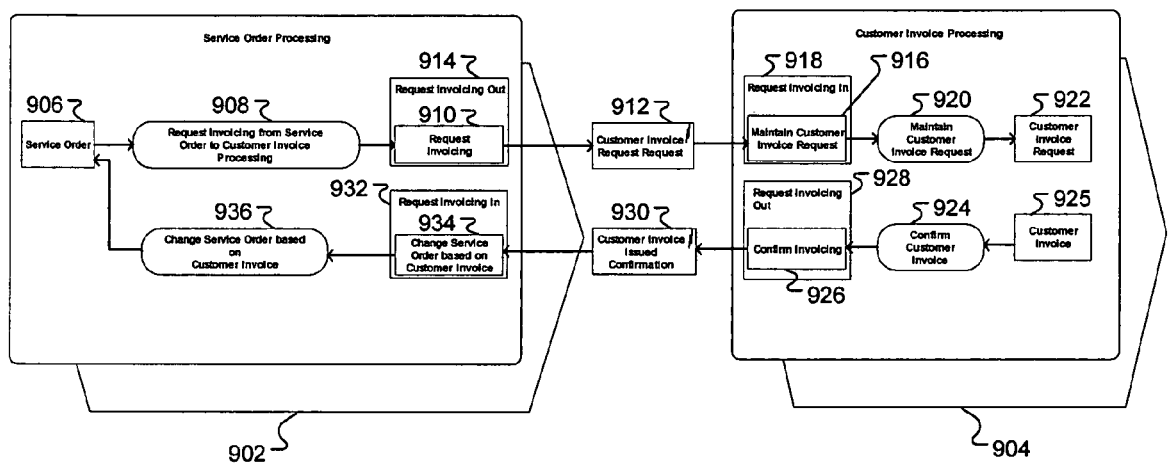
FIG. 9 is a block diagram showing interactions between a Service Order Processing process component and a Customer Invoice Processing process component.

FIG. 9 is a block diagram showing interactions between a Service Order Processing process component 902 and a Customer Invoice Processing process component 904 in the architectural design of FIG. 1.

The Service Order Processing process component 902 includes a Service Order business object 906 that represents customer orders to service providers for the delivery of services which can possibly include the exchange of spare parts in an after sales situation.

In the Service Order Processing process component 902, a Request Invoicing from Service Order to Customer Invoice Processing outbound process agent 908 uses a Request Invoicing operation 910 to send a Customer Invoice Request Request message 912 to the Customer Invoice Processing process component 904. The Request Invoicing operation 910 is part of a Request for Quote Out interface 914.

The Customer Invoice Request Request message 912 is received by a Maintain Customer Invoice Request operation 916 that creates, updates, deletes or requests cancellation of a customer invoice request in an Invoice Verification In interface 918. The Maintain Customer Invoice Request operation 916 initiates a Maintain Customer Invoice Request inbound process agent 920, which creates or updates a Customer Invoice Request business object 922 to take over the billing relevant data from the initiator of the billing process.

Next, the Confirm Customer Invoice outbound process agent 924 receives the Customer Invoice business object information 925 and initiates a Confirm Invoicing operation 926 in a Request Invoicing Out Interface 928. A Customer Invoice Issued Confirmation message 930 is generated and sent to the Service Order Processing process component 902.

The message 930 is received in the Request Invoicing In interface 932. The interface 932 includes a Change Service Order based on Customer Invoice operation 934 that documents information about issued customer invoices in the service order. The update is sent to the Service Order business object 906 using a Change Service Order based on Customer Invoice inbound process agent 936.

Interactions between Process Components "Confirmation and Inventory" and "Accounting"

Figure 10:
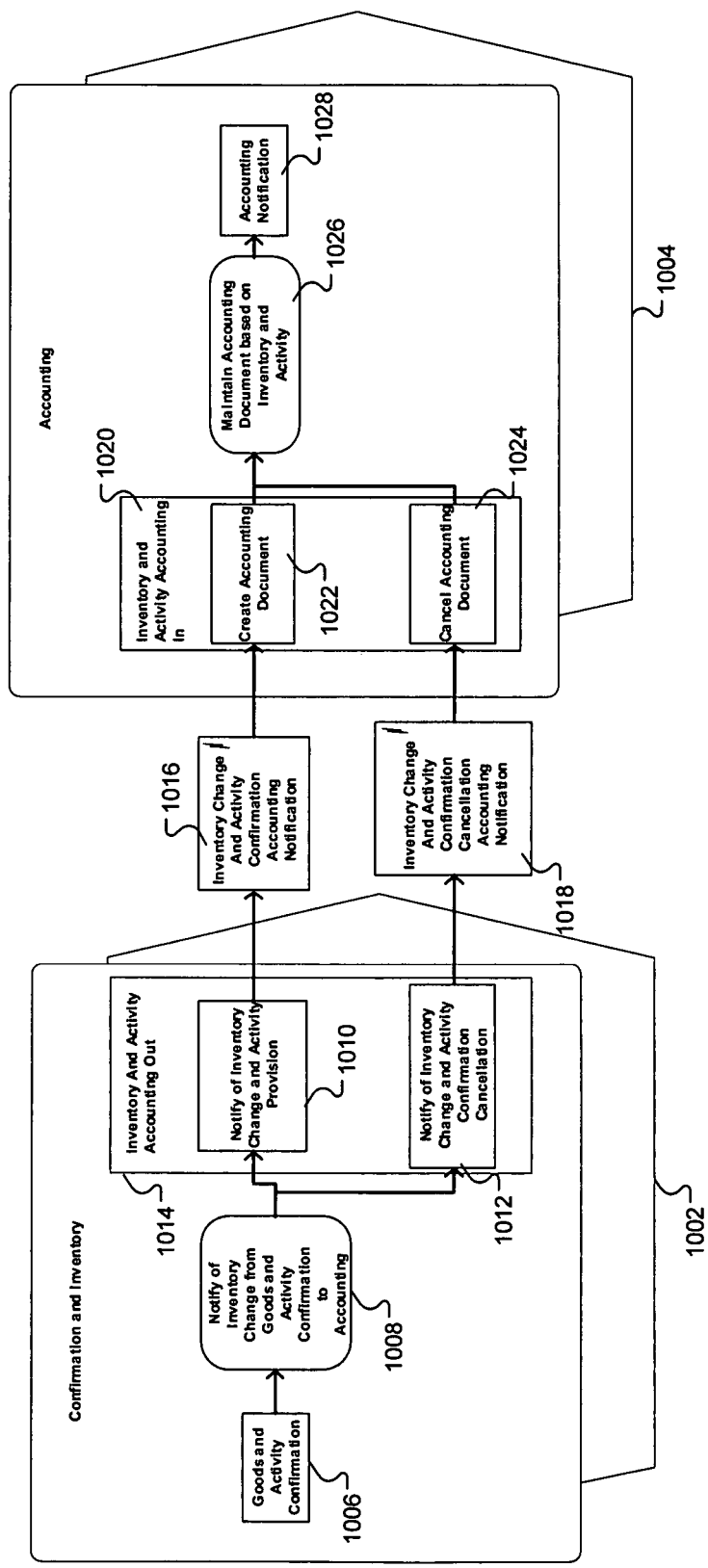
FIG. 10 is a block diagram showing interactions between a Confirmation and Inventory process component and an Accounting process component.

FIG. 10 is a block diagram showing interactions between a Confirmation and Inventory process component 1002 and an Accounting process component 1004 in the architectural design of FIG. 1.

The Confirmation and Inventory process component 1002 includes a Goods and Activity Confirmation business object 1006 that contains all actual data reflecting an 'ad-hoc' executed work. For example, actual data may include a notification of scrap material, a goods issue for account assignment or a change of stock category update. In particular, the execution was not pre-planned based on a production or site logistics order.

The Notify of Inventory Change From Goods and Activity Confirmation to Accounting outbound process agent 1008 can invoke a Notify of Inventory Change and Activity Confirmation operation 1010 to update an inventory change or to update an action consumption posting. Alternatively, a Request Inventory Change and Activity Confirmation Cancellation operation 1012 may be invoked to send Inventory Change Accounting Cancellation updates to Accounting. Both operations may be used in an Inventory and Activity Accounting Out interface 1014. If the Notify of Inventory Change and Activity Confirmation operation 1010 is invoked, then an Inventory Change and Activity Confirmation Accounting Notification message 1016 is sent to the Accounting process component 1004. If the Request Inventory Change and Activity Confirmation Cancellation operation 1012 is invoked, the Inventory Change and Activity Confirmation Accounting Cancellation Notification message 1018 is sent to the Accounting process component 1004.

The messages 1016 and 1018 are received by an Inventory and Activity Accounting In interface 1020 where operations may be performed. If a notification message 1016 is received, then a Create Accounting Document operation 1022 is performed to receive Inventory Change Accounting Notifications from Confirmation and Inventory, Site Logistics Processing or Production. If a cancellation message 1018 is received, then a Cancel Accounting Document operation 1024 is performed to Receive Inventory Change Accounting Cancellation Request from Confirmation and Inventory, Site Logistics Processing or Production. Cancellations and updates may be sent by a Maintain Accounting Document based on Inventory and Activity inbound process agent 1026 to an Accounting Notification business object 1028.

Interactions between Process Components "Payment Processing" and "Payment Order Processing at House Bank"

Figure 11:
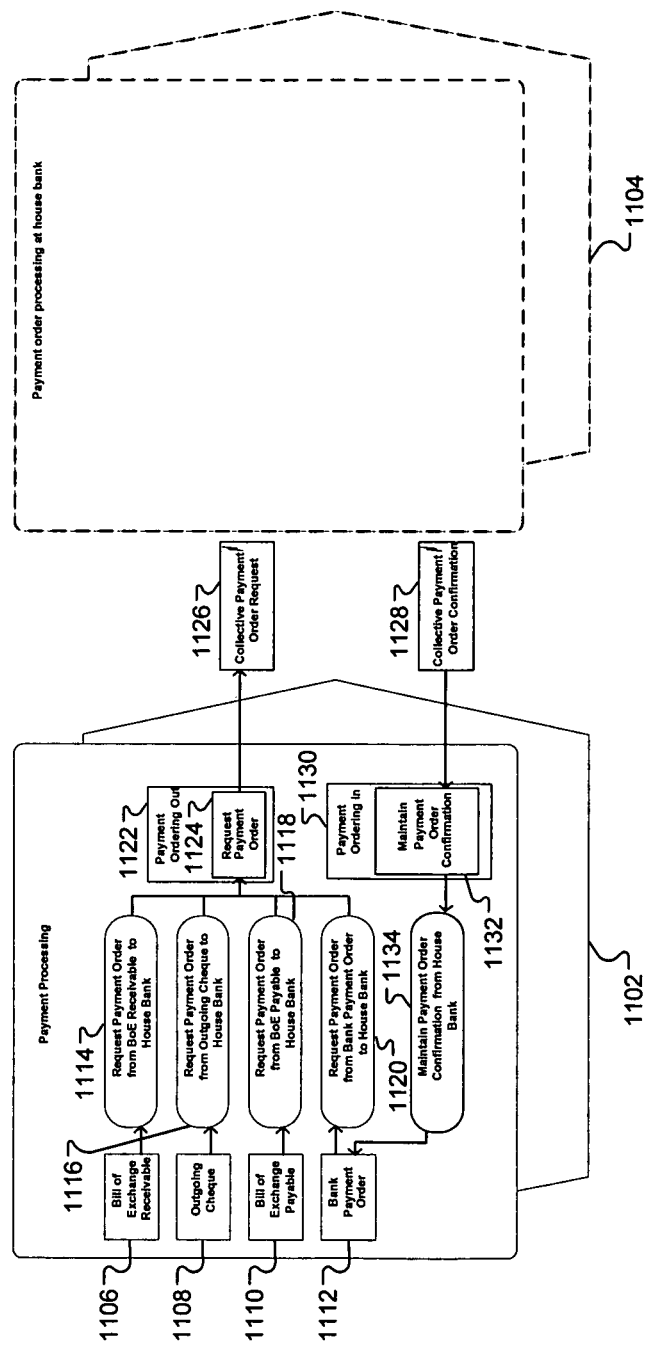
FIG. 11 is a block diagram showing interactions between a Payment Processing process component and a Payment Order processing at house bank process component.

FIG. 11 is a block diagram showing interactions between a Payment Processing process component 1102 and a Payment Order processing at house bank process component 1104 in the architectural design of FIG. 1.

The Payment Processing process component 1102 includes four business objects: a Bill of Exchange Receivable business object 1106 that represents a Bill of Exchange received from or a Bill of Exchange Request sent to a business partner, an Outgoing Check business object 1108 that represents a check sent to a business partner that is created via payment order, a Bill of Exchange Payable business object 1110 that represents a Bill of Exchange sent to a business partner that is created only via payment order, and a Bank Payment Order business object 1112 which is a Payment Order that will be sent to a house bank and may contain bank transfers as well direct debits.

The Request Payment Order from Bill of Exchange Receivable to House Bank 1114 creates an electronic Bill of Exchange Receivable (Request). The Request Payment Order from Outgoing Check to House Bank 1116 creates an outgoing check to be printed externally. The Request Payment Order from Bill of Exchange Payable to House Bank 1118 creates an electronic Bill of Exchange Payable. The Request Payment Order from Bank Payment Order to House Bank 1120 creates a Payment order to House Bank.

The Payment Ordering out interface 1122 receives the updates from the outbound process agents 1114, 1116, 1118, 1120. A Request Payment Order operation 1124 collects Bank Transfers or Direct Debits for payment submission to the business partner. A Collective Payment Order Request message 1126 is generated and processed by the Payment order processing at house bank process component 1104. Upon completion of processing, a Collective Payment Order Confirmation message 1128 is sent to the Payment Ordering In interface 1130 that includes a Maintain Payment Order Confirmation operation 1132 to confirm the status updates from processing a payment order. After completing the operation 1132, an update is sent to the Bank Payment Order business object 1112 using the Maintain Payment Order Confirmation from House Bank inbound process agent 1134.

Interactions between Process Components "Service Confirmation Processing" and "Accounting"

Figure 12:
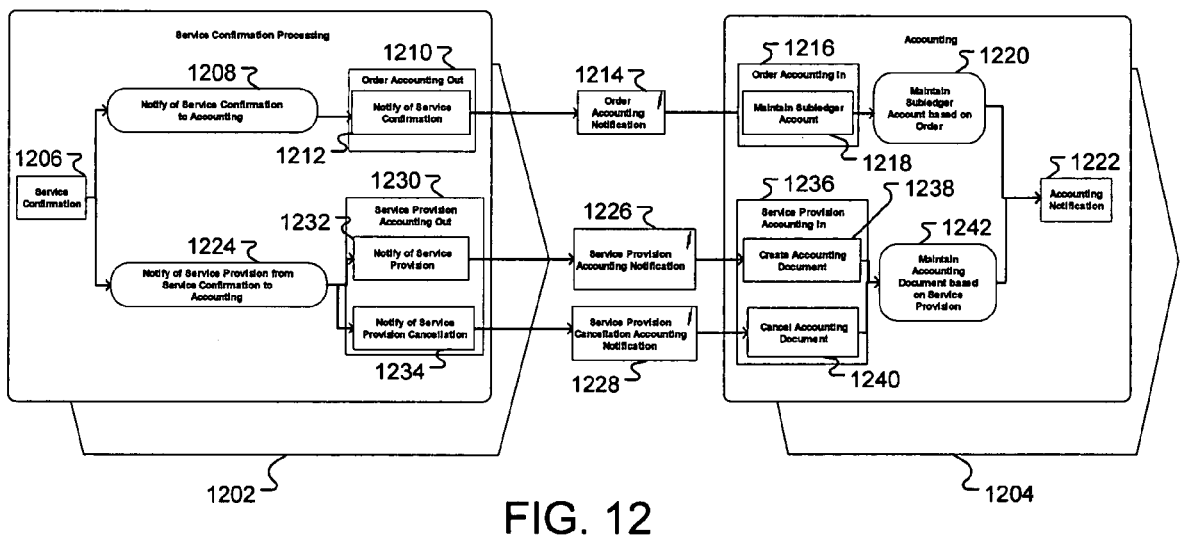
FIG. 12 is a block diagram showing interactions between a Service Confirmation Processing process component and an Accounting process component.

FIG. 12 is a block diagram showing interactions between a Service Confirmation Processing process component 1202 and an Accounting process component 1204 in the architectural design of FIG. 1.

The Service Confirmation Processing process component 1202 includes a Service Confirmation business object 1206 that stores the actual resource consumption of performed service operations including working time, parts and expenses related to service fulfillment. The Service Confirmation business object 1206 may use a Notify of Service Confirmation to Accounting inbound process agent 1208 to update an Order Accounting Out interface 1210. The Order Accounting Out interface 1210 includes a Notify of Service Confirmation operation 1212 that notifies Accounting about the creation, change, or deletion of a service confirmation. An Order Accounting Notification message 1214 is generated and sent to the Accounting process component 1204. The Accounting process component 1204 receives the notification message 1214 in an Order Accounting In interface 1216, which includes a Maintain Subledger Account operation 1218 that receives order accounting notifications from the following process components: Service Confirmation Processing, Service Contract Processing, Service Request Processing, Service Order Processing, Purchase Order Processing and Sales Order Processing. The notification is to inform the Accounting process component 1204 about creation, change or deletion of any kind of order business objects. A Maintain Subledger Account based on Order inbound process agent 1220 may then update an Accounting Notification business object 1222. The Accounting Notification business object 1222 is a common input channel for all kinds of operational business transactions into Financial Accounting that is called by operational components in order to record the business transactions in Financial Accounting.

Alternatively, the Service Confirmation business object 1206 may use a Notify of Resource Consumption from Service Confirmation to Accounting outbound process agent 1224 to send a Resource Consumption Notification message 1226 or a Resource Consumption Cancellation Request message 1228. The Service Confirmation Processing process component 1202 passes information into a Resource Consumption Accounting Out interface 1230 which includes a Notify of Resource Consumption operation 1232 or a Request Resource Consumption Cancellation operation 1234. The Notify of Resource Consumption operation informs Accounting Processing about service provisions such as activity consumption or resource consumption and generates the Resource consumption Notification message 1226. The Request Resource Consumption Cancellation operation 1234 cancels a service provision and generates a Resource Consumption Cancellation Request message 1228.

The Resource Consumption Notification message 1226 may be received by a Resource Consumption Accounting In interface 1236, which includes a Create Accounting Document operation 1238 that receives resource consumption notifications from Production, Service Request Processing, Service Confirmation Processing, Time and Labor Management and Project Processing. A Cancel Accounting Document operation 1240 may also be invoked if a Resource Consumption Cancellation Request message 1228 is received. A Maintain Accounting Document based on Resource Consumption inbound process agent 1242 may then update the Accounting Notification business object 1222.

Interactions between Process Components "Site Logistics Processing" and "Accounting"

Figure 13:
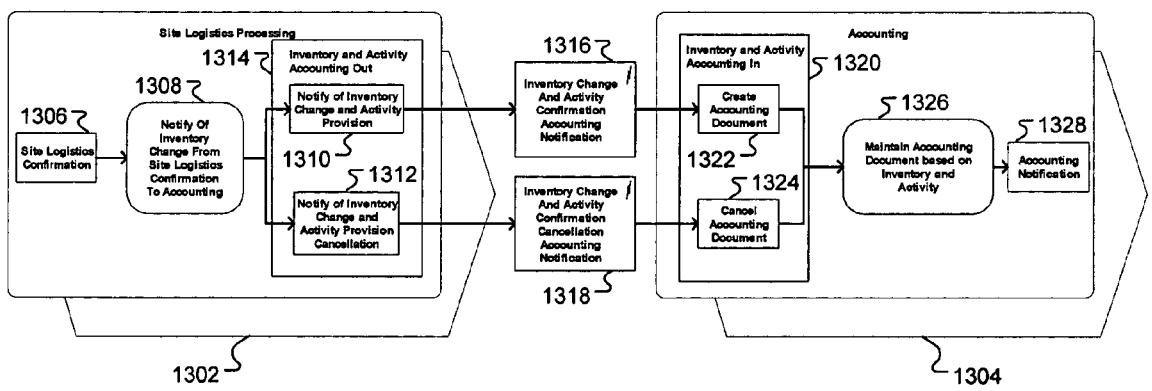
FIG. 13 is a block diagram showing interactions between a Site Logistics Processing process component and an Accounting process component.

FIG. 13 is a block diagram showing interactions between a Site Logistics Processing process component 1302 and an Accounting process component 1304 in the architectural design of FIG. 1. The Site Logistics Processing process component 1302 includes a Site Logistics Confirmation business object 1306, which is a document that collects actual data posted with reference to a site logistics order, or site logistics request. The site logistics confirmation updates inventory, finance and planning.

The Notify of Inventory Change From Site Logistics Confirmation to Accounting outbound process agent 1308 includes a Notify of Inventory Change and Activity Provision operation 1310 to send an Inventory Change Accounting Notification to Accounting message 1316 to the Accounting process component 1304. Alternatively, a Request Inventory Change and Activity Provision Cancellation operation 1312 may be invoked to request inventory change and activity provision cancellation. Both operations may be used in an Inventory and Activity Accounting Out interface 1314. If the Request Inventory Change and Activity Provision Cancellation operation 1312 is invoked, the Inventory Change and Activity Confirmation Accounting Cancellation Request message 1318 is sent to the Accounting process component 1304.

The messages 1316 and 1318 are received by an Inventory and activity Accounting In interface 1320 where operations may be performed. If a notification message 1316 is received, then a Create Receivables/Payables operation 1322 is performed to Receive Inventory Change Accounting Notification from Confirmation and Inventory or Site Logistics Processing or Production. If a cancellation message 1318 is received, then a Cancel Accounting Document operation 1324 is performed to Receive Inventory Change Accounting Cancellation Request from Confirmation and Inventory or Site Logistics Processing or Production. Cancellations and updates may be sent by a Maintain Accounting Document based on Inventory and Activity inbound process agent 1326 to an Accounting Notification business object.

Interactions between Process Components "Customer Invoice Processing" and "Accounting"

Figure 14:
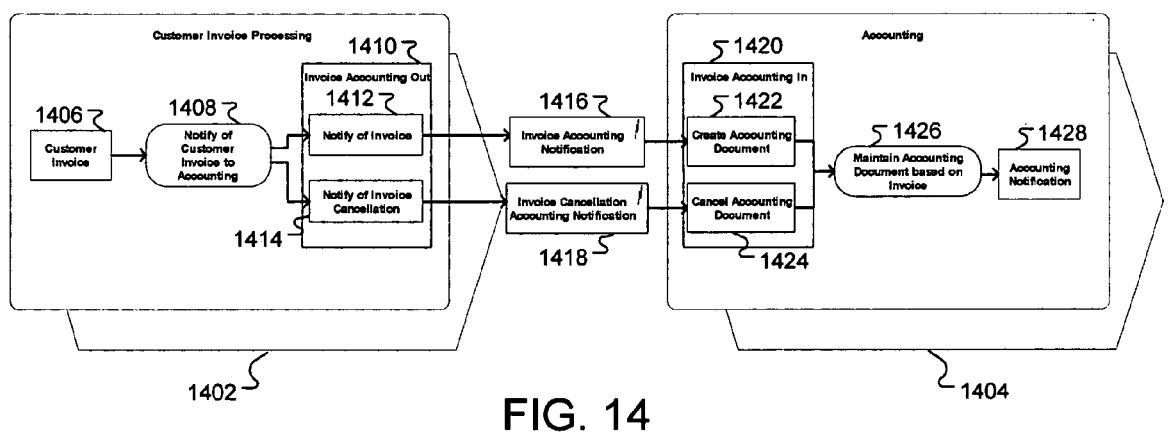
FIG. 14 is a block diagram showing interactions between a Customer Invoice Processing process component and an Accounting process component.

FIG. 14 is a block diagram showing interactions between a Customer Invoice Processing process component 1402 and an Accounting process component 1404 in the architectural design of FIG. 1.

The Customer Invoice Processing process component 1402 includes a Customer Invoice business object 1406. The Customer Invoice business object 1406 is used to charge a customer for delivery of goods or services. A customer invoice is then sent into a Notify of Customer Invoice to Accounting outbound process agent 1408, which notifies accounting of the existence of the customer invoice.

The processing agent provides an Invoice Accounting Out interface 1410 with the notification and additional data such as invoice billing numbers or a credit memo. Here, the interface 1410 includes a Notify of Invoice operation 1412 and a Request Invoice Cancellation operation 1414. The Notify of Invoice operation 1412 may be invoked if the invoice accounting out interface receives a notification to post an invoice. Upon performing the Notify of Invoice operation 1412, the outbound process agent transmits an Invoice Accounting Notification message 1416 with the invoice accounting notification. Alternatively, the Request Invoice Cancellation operation 1414 may be invoked if the Invoice Accounting Out interface 1410 receives information requesting a cancellation. For example, the Request Invoice Cancellation operation 1414 may be invoked in order to cancel an invoice. Upon performing the Request Invoice Cancellation operation 1414, the Notify of Customer Invoice Accounting outbound process agent 1408 transmits an Invoice Accounting Cancellation message 1418 with the invoice accounting cancellation request.

The Accounting process component 1404 may receive messages sent by the Supplier Invoice Processing process component 1404. Here, an Invoice Accounting interface 1420 includes a Create Accounting Document operation 1422 that creates an accounting document for a customer invoice or supplier invoice if accounting receives the Invoice Accounting Notification message 1416. The Invoice Accounting interface 1420 also includes a Cancel Accounting Document operation 1424 that cancels a customer or supplier invoice.

The Accounting process component 1404 includes a Maintain Accounting Document based on Invoice inbound process agent 1426 that can maintain accounting documents. For example, the inbound process agent 1426 may update the accounting document if a creation or cancellation operation is received. After updating the accounting document, the inbound process agent 1426 may forward information about the updated document into an Accounting Notification business object 1428. The Accounting Notification business object 1428 may receive input from operational business transactions, such as the invoice notification above, and record the business transactions in the Financial Accounting deployment unit.

Interactions between Process Components "Service Order Processing" and "Accounting"

Figure 15:
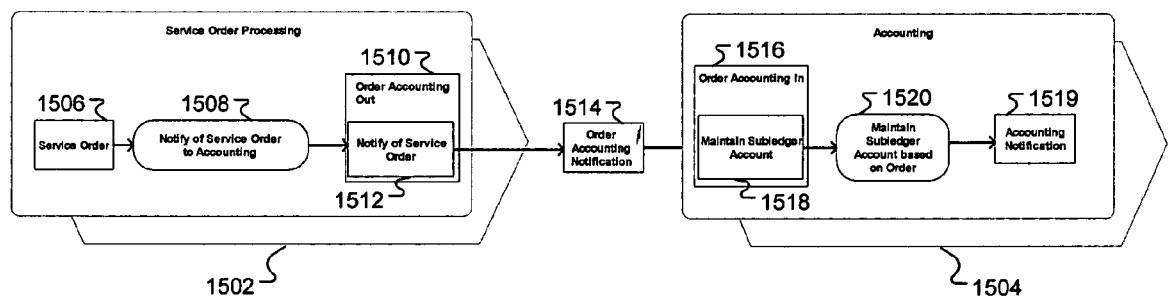
FIG. 15 is a block diagram showing interactions between a Service Order Processing process component and an Accounting process component.

FIG. 15 is a block diagram showing interactions between a Service Order Processing process component 1502 and an Accounting process component 1504 in the architectural design of FIG. 1.

The Service Order Processing process component 1502 includes the Service Order business object 1506, which passes information into a Notify of Service Order to Accounting outbound process agent 1508. The information may contain notifications about created, changed or cancelled purchase orders.

The outbound process agent 1508 sends notification into an Order Accounting Out interface 1510 which includes a Notify of Service Order operation 1512. The Notify of Service Order operation 1512 may be called when a service order has been created, changed or cancelled. An Order Accounting Notification message 1514 may then be sent to the Accounting process component 1504.

The Accounting process component 1504 receives the Order Accounting Notification message 1514 in the interface 1516 which includes a Maintain Subledger Account operation 1518 that receives order accounting notifications from the Service Order Processing process component 1502. The notification message 1514 informs the Accounting Processing process component 1504 about the creation, the change, or the deletion of any kind of order business objects. The notification may then be sent to the Accounting Notification business object 1519 using an inbound process agent 1520. The Accounting Notification business object 1519 is a common input channel for all kinds of operational business transactions into Financial Accounting that is called by operational components in order to record the business transactions in Financial Accounting.

Interactions between Process Components "Service Request Processing External Requester System" and "Service Request Processing"

Figure 16:
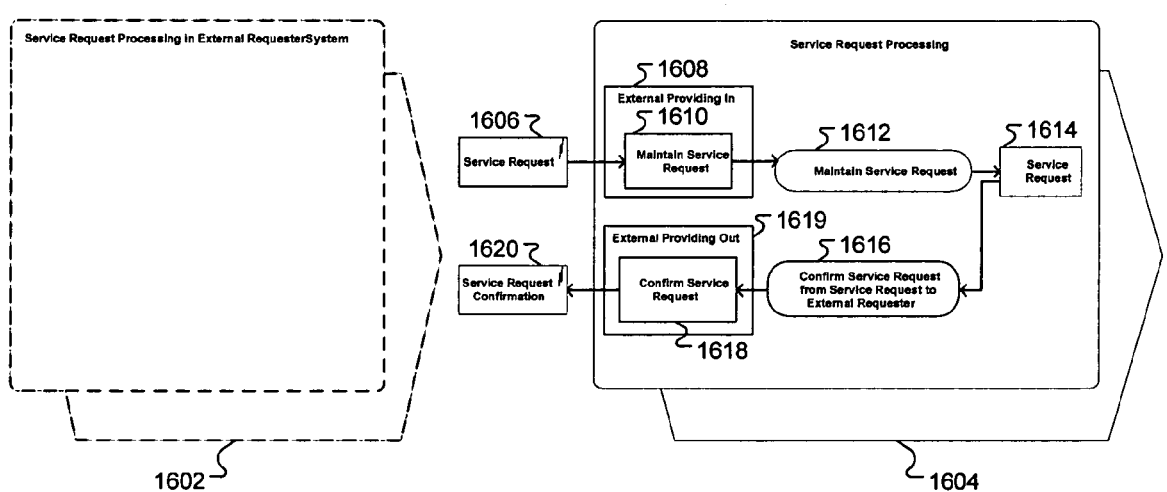
FIG. 16 is a block diagram showing interactions between a Service Request Processing External Requester System process component and a Service Request Processing process component.

FIG. 16 is a block diagram showing interactions between a Service Request Processing External Requester System process component 1602 and a Service Request Processing process component 1604 in the architectural design of FIG. 1.

The Service Request Processing process component 1604 receives a Service Request message 1606 into an External Providing In interface 1608 which includes a Maintain Service Request operation 1610. The Maintain Service Request operation 1610 creates or updates service requests using messages received from external requester systems. A Maintain Service Request inbound process agent 1612 updates a Service Request business object 1614. The Service Request business object 1614 is a service notification reflecting the initial inquiry of a customer when contacting a Customer Service and Support Center.

After the update occurs, a Confirm Service Request from Service Request to External Requestor outbound process agent 1616 sends an update to a Confirm Service Request operation 1618 that creates, updates, or processes confirmations to the external requester systems. The operation 1618 is part of an External Providing out interface 1619. A Service Request Confirmation message 1620 is generated and transmitted to the Service Request Processing External Requester System process component 1602.

Interactions between Process Components "Due Item Processing" and "Payment Processing"

Figure 17:
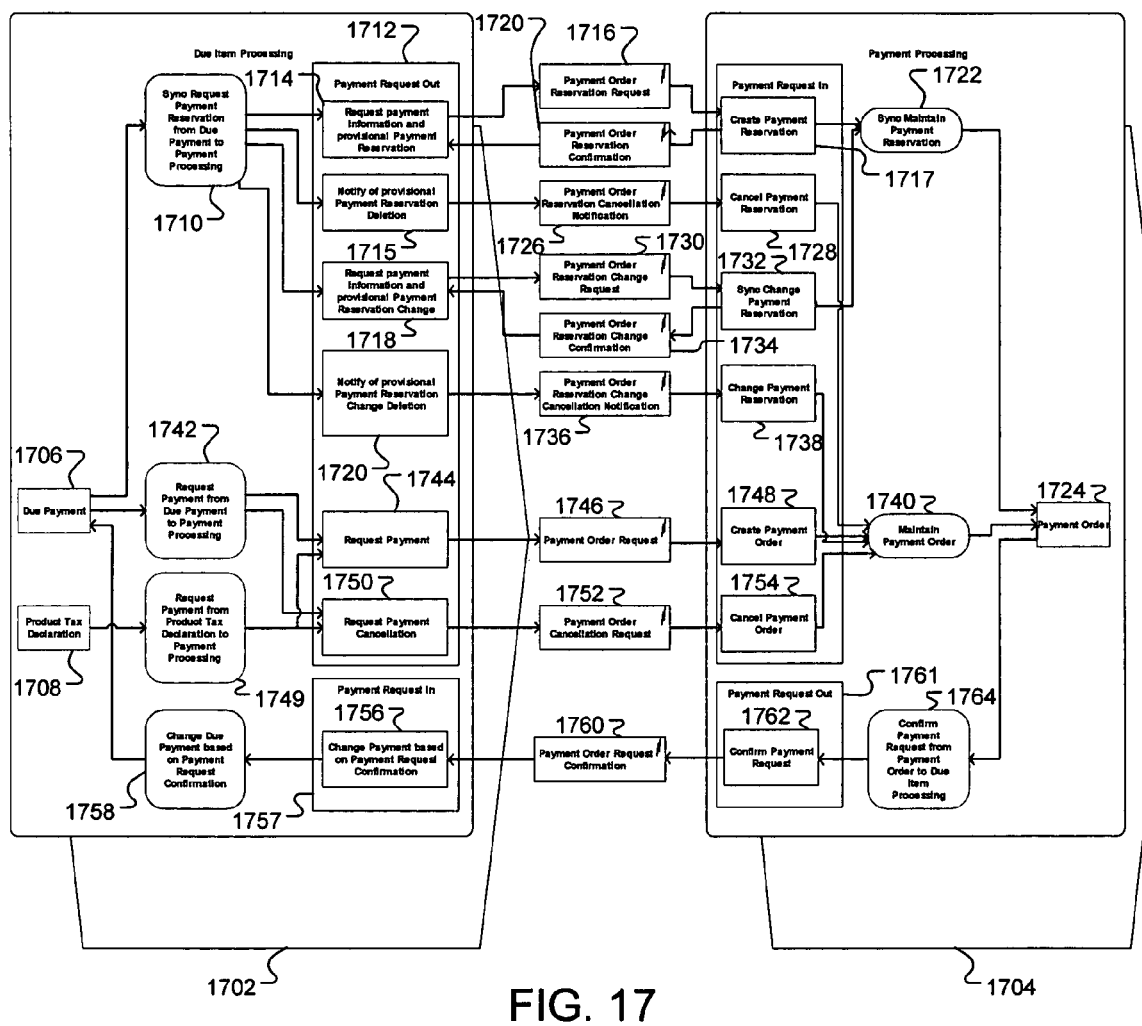
FIG. 17 is a block diagram showing interactions between a Due Item Processing process component and a Payment Processing process component.

FIG. 17 is a block diagram showing interactions between a Due Item Processing process component 1702 and a Payment Processing process component 1704 in the architectural design of FIG. 1. The Due Item Processing process component 1702 may be used to manage all payables and receivables from service and supply and corresponding sales including a withholding tax. The Payment Processing process component 1704 is used to handle all incoming and outgoing payments and represent the main database for a liquidity status.

The process components include business objects to create and update data by passing messages between the Payment Request process component 1704 and the Due Item Processing process component 1702. Multiple operations can be carried out within the interfaces. Both inbound and outbound process agents carry the business object data to and from the interfaces.

A due payment business object 1706 may create payment requests manually or automatically for payment processing. The due payment business object 1706 is responsible for the payment and clearing of payables and receivables for goods and services. A product tax declaration business object 1708 is a declaration of the product tax liabilities/receivables of a company to the responsible tax authority according to the tax declaration arrangement and country specific legal requirements that triggers the payment to the tax authority.

A Synchronous Request Payment Reservation interface from Due Payment to Payment Processing outbound process component 1710 may create a payment reservation request from Due Payment. The Payment Request Out interface 1712 includes several operations which go on to create messages and updates to business objects in the Payment Processing process component 1704. The operations, messaging and business objects are discussed in the following paragraphs.

The Payment Request Out interface 1712 includes a synchronous Request payment information and provisional Payment Reservation operation 1714 that generates a Payment Order Reservation Request message 1716 to request a payment order reservation. A synchronous Create Payment Reservation operation 1717 receives the message and uses a Sync Maintain Payment Reservation inbound process agent 1722 to update a Payment Order business object 1724. In addition, a Payment Order Reservation Confirmation synchronous message 1720 is sent back to the Due Item Processing process component 1702.

The Payment Request Out interface 1712 also includes a Notify of provisional Payment Reservation Deletion operation 1715 that registers the change of a provisional payment to the last transactional/saved state. A Payment Order Reservation Cancellation Notification message 1727 may be generated and a Cancel Payment Reservation operation 1728 may be invoked that cancels a previously sent payment reservation by reference. Next, a maintain Payment Order inbound process agent sends an update to the Payment Order business object 1724.

The Payment Request Out interface 1712 further includes a synchronous Request Payment Information and provisional Payment Reservation Change operation 1718 that requests payment information with a provisional reservation of money in payment processing. A Payment Order Reservation Change Request synchronous message 1730 is generated and a synchronous Sync Change Payment Reservation operation 1732 is invoked that changes a reservation of payment and confirms the change to the caller. Next, a Payment Reservation Confirmation synchronous message 1734 may be generated and sent back to the Due Item Processing process component 1702.

The Payment Request Out interface 1712 further includes a Notify of provisional Payment Reservation Change Deletion operation 1720 that registers the change of a provisional payment to the last transactional/saved state. A Payment Order Reservation Change Deletion Cancellation Notification message 1736 may be generated and a Change Payment Reservation operation 1738 may be invoked that changes a previously sent payment reservation by reference. Upon completion of the operation 1738, the Maintain Payment Order inbound process agent 1740 updates the Payment Order business object 1724.

A Request Payment from Due Payment to Payment Processing outbound process agent 1742 may send a payment update to the Payment Processing process component 1704 from a Due Payment business object 1706. A Request Payment operation 1744 is then invoked that sends a request for payment to Payment Processing. Upon completion of the operation, a Payment Order Request message 1746 is sent the Payment Processing process component 1704, where a Create Payment Order operation 1748 begins. Then, the Maintain Payment Order inbound process agent 1740 updates the Payment Order business object 1724 to create or cancel a payment order.

A Request Payment from Product Tax Declaration to Payment Processing outbound process agent 1759 may send an update from a Product Tax Declaration business object 1708. The update is sent into the Payment Request Out interface 1712 and a Request Payment Cancellation operation 1750 is invoked to cancel a provisional, requested or ordered payment. A Payment Order Cancellation Request message 1752 is then generated and sent to the Payment Processing process component where a Cancel Payment Order operation 1754 is invoked.

The payment order business object may use a Confirm Payment Request from Payment Order to Due Item Processing outbound process agent 1764 to confirm the processing status of a payment to the sender of a payment request. A Confirm Payment Request operation 1762 may then be invoked, thereby generating a Payment Order Request Confirmation message 1760 to send to the Due Item Processing process component 1702. The message is received in a Change payment based on Payment Request Confirmation operation 1756 that uses a Change Due Payment based on Payment Request Confirmation outbound process agent 1758 to update the processing status of Due Payment based on the confirmation of a payment request.

Interactions between Process Components "Payment Processing" and "Payment Processing at Business Partner"

Figure 18:
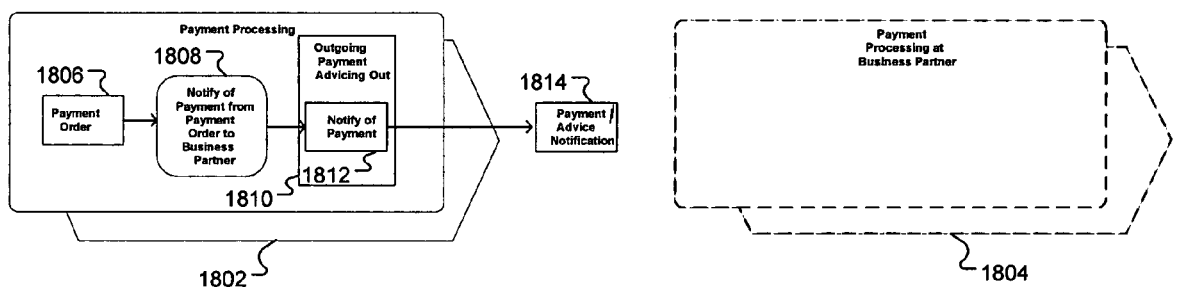
FIG. 18 is a block diagram showing interactions between a Payment Processing process component and a Processing at Business Partner process component.

FIG. 18 is a block diagram showing interactions between a Payment Processing process component 1802 and a Processing at Business Partner process component 1804 in the architectural design of FIG. 1. The Payment Processing process component 1802 is used to handle all incoming and outgoing payments and to represent the main database for a liquidity status. Business partners may be any third party operating an independent system.

The interaction model begins in the Payment Processing process component 1802 with a Payment Order business object 1806. The Payment Order business object 1806 creates payment media for either a bank, a credit card, a settlement institute, or a business partner on the base of payment requests. After the payment media is created, the Payment Order business object 1806 sends a notification using a Notify of Payment from the Payment Order to the Business Partner outbound process agent 1808. A Payment Order can create different (sub) items within a payment that is sent if the payment medium is subject to amount limitations. The Payment Processing process component 1802 also contains an Outgoing Payment Advicing Out interface 1810 that includes a Notify of Payment operation 1812. The Notify of Payment operation 1812 creates a payment advice and sends a Payment Advice Notification message 1814 to the Payment Processing at Business Partner processing component 1804.

Interactions between Process Components "Service Request Processing" and "Accounting"

Figure 19:
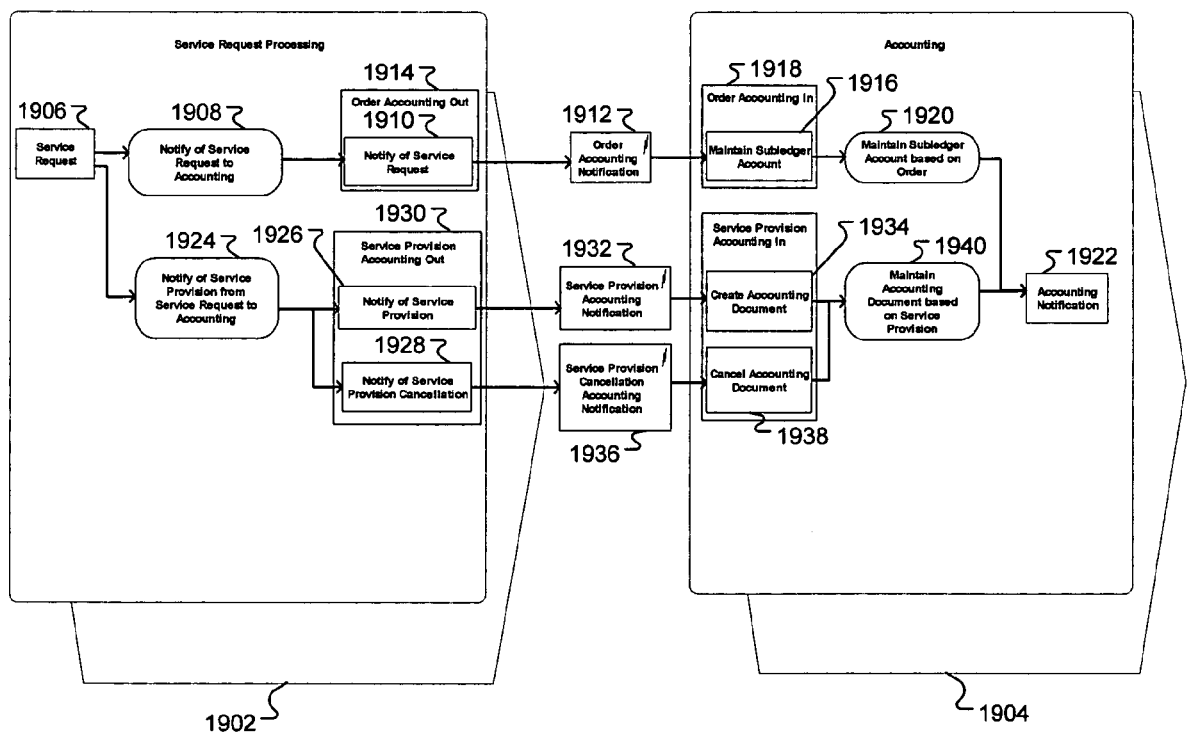
FIG. 19 is a block diagram showing interactions between a Service Request Processing process component and an Accounting process component.

FIG. 19 is a block diagram showing interactions between a Service Request Processing process component 1902 and an Accounting process component 1904 in the architectural design of FIG. 1.

The Service Request Processing process component 1902 includes a Service Request business object 1906. The Service Request business object 1906 contains a notification reflecting the initial inquiry of a customer when contacting a Customer Service and Support Center. In the Service Request Processing process component 1902, a Notify of Service Request to Accounting outbound process agent 1908 requests the execution of a request for quote. The outbound process agent 1908 uses a Notify of Service Request operation 1910 to send an Order Accounting Notification message 1912 notifying accounting about the creation, change or deletion of a service request. The Notify of Service Request operation 1910 is part of a Order Accounting Out interface 1914.

The Order Accounting Notification message 1912 is received by a Maintain Subledge Account operation 1916 in an Order Accounting In interface 1918, where the operation 1916 receives order accounting notification to inform Accounting Processing about creation, change or deletion of any kind of order business objects. Next, the Maintain Subledge Account based on Order outbound process agent 1920 receives the request for quote and updates the Accounting Notification business object 1922. The Accounting Notification business object 1922 is a common input channel for all kinds of operational business transactions into Financial Accounting that can be called by operational components in order to record the business transactions in Financial Accounting.

Alternatively, the Service Request Processing process component 1902 may notify the Accounting process component 1904 of a particular resource consumption. FIG. 19 shows a Notify of Resource Consumption from Service Request to Accounting outbound process agent 1924 using both a Notify of Resource Consumption operation 1926 and a Request Resource Cancellation operation 1928 to update the Accounting process component 1904. Both operations 1926, 1928 are part of a Resource Consumption Accounting Out interface 1930. If the Notify of Resource Consumption Operation 1926 is invoked, a Resource Consumption Notification message 1932 is transmitted to the Accounting process component 1904. The message 1932 is received in the Create Accounting Document operation 1934. If the Request Resource Consumption Cancellation operation 1928 is invoked, a Resource Consumption Cancellation Request message 1936 is transmitted to the Accounting process component 1904. The message 1936 is received in the Cancel Accounting Document operation 1938. After completion of the Create Accounting Document operation 1934 or the Cancel Accounting Document operation 1938, a Maintain Accounting Document based on Resource Consumption inbound process agent 1940 updates the Accounting Notification business object 1922.

Interactions between Process Components "Payment Processing" and "Due Item Processing"

Figure 20:
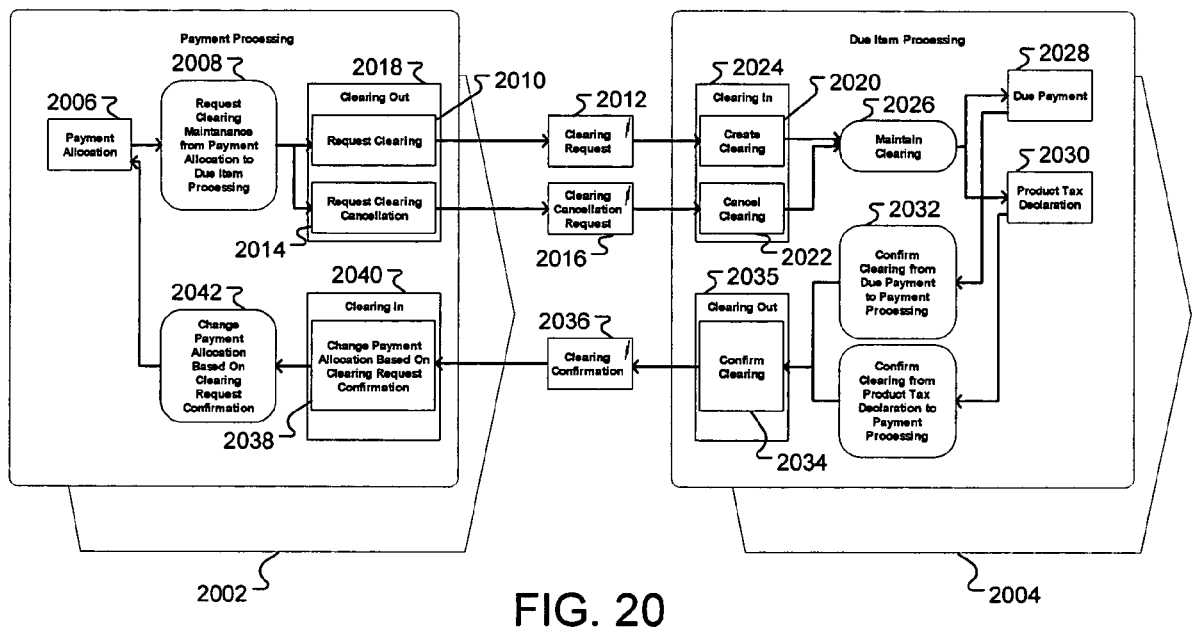
FIG. 20 is a block diagram showing interactions between a Payment Processing process component and a Due Item Processing process component.

FIG. 20 is a block diagram showing interactions between a Payment Processing process component 2002 and a Due Item Processing process component 2004 in the architectural design of FIG. 1.

The a Payment Processing process component 2002 includes a Payment Allocation business object 2006. The Payment Allocation business object 2006 documents a process step by which open payments of different type belonging to one another are indicated as confirmed or sent to other components for post processing. In the Payment Processing process component 2002, a Request Clearing Maintenance from Payment Allocation to Due Item Processing outbound process agent 2008 uses a Request Clearing operation 2010 to send a Clearing Request message 2012 to request the clearing of payments within the Due Item Processing process component 2004. Alternatively, the outbound process agent 2008 may invoke a Request Clearing Cancellation operation 2014 to cancel a payment clearing using a Clearing Cancellation Request message 2016. Both operations 2010, 2014 are part of a clearing Out interface 2018 in the Payment Processing process component 2002.

The messages 2012, 2016 are received in the Due Item Processing process component 2004 in a Create Clearing operation 2020 and a Cancel Clearing operation 2022 respectively. The Create Clearing operation 2020 and the Cancel Clearing operation 2022 are both part of a Clearing In interface 2024. Upon creating or canceling clearing, a Maintain Clearing inbound process agent 2026 may update a Due Payment business object 2028 or a Product Declaration business object 2030, or both.

The Due Payment business object 2028 creates payment requests for payment processing. A Confirm Clearing from Due Payment to Payment Processing outbound process agent 2032 may invoke a Confirm Clearing operation 2034 that sends a Clearing Confirmation message 2036 to payment processing for a clearing request. The operation 2034 is part of a Clearing Out interface 2035 The message 2036 is received by a Change Payment Allocation based On Clearing request Confirmation operation 2038 that confirms the execution or rejection of a sent Clearing Request. The operation 2038 is part of a Clearing In interface 2040. An update may be sent to the Payment Allocation business object 2006 using a Change Payment Allocation Based on Clearing Request Confirmation inbound process agent 2042.

The Product Tax Declaration business object 2030 is a declaration of the product tax liabilities/receivables of a company to the responsible tax authority according to the tax declaration arrangement and country specific legal requirements that triggers the payment to the tax authority. The Product Tax Declaration business object 2030 may invoke the same sequence of events that the Due Payment business object 2028 above has completed.

Interactions between Process Components "Customer Invoice Processing" and "Supplier Invoice Processing at Customer"

Figure 21:
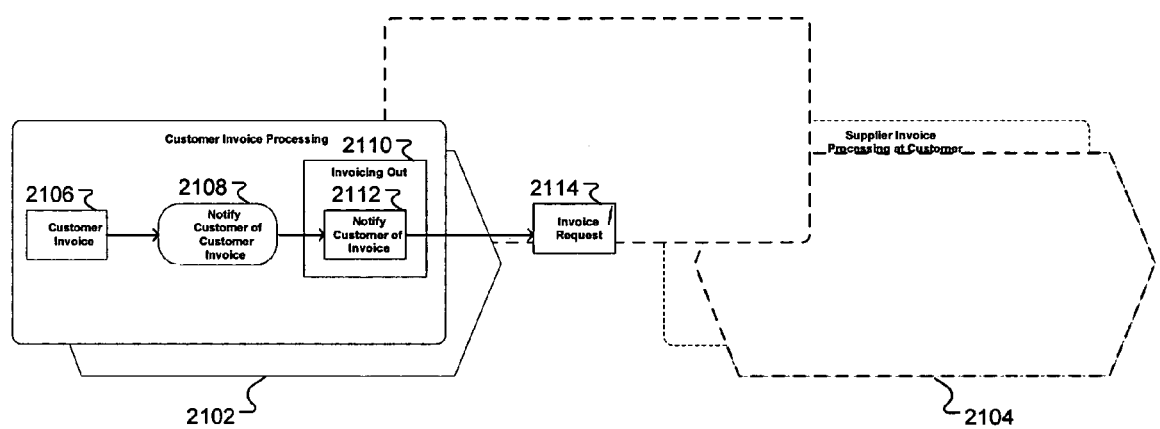
FIG. 21 is a block diagram showing interactions between a Customer Invoice Processing process component and a Supplier Invoice Processing at Customer process component.

FIG. 21 is a block diagram showing interactions between a Customer Invoice Processing process component 2102 and a Supplier Invoice Processing at Customer process component 2104 in the architectural design of FIG. 1.

The Customer Invoice Processing process component 2102 contains a Customer Invoice business object 2106, a Notify Customer of Customer Invoice inbound process agent 2108, and a Notify Customer of Invoice operation in an Invoicing Out interface 2110. The Customer Invoice business object 2106 is an object used to charge a customer for delivery of goods or services.

The Customer Invoice business object 2106 initiates the Notify Customer of Invoice operation 2112 to fill billing document with data for customer usage. Upon completion of the operation 2112, the Notify of Customer Invoice operation 2112 transmits an Invoice Request message 2114 requesting that the update be made.

Interactions between Process Components "Bank statement creation at bank" and "Payment Processing"

Figure 22:
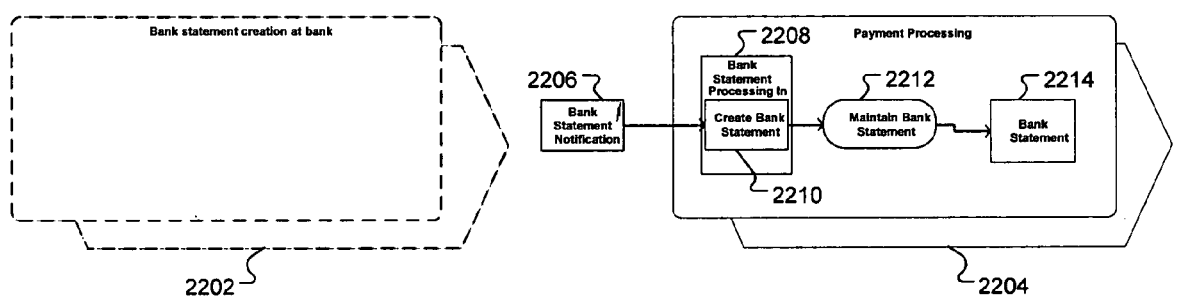
FIG. 22 is a block diagram showing interactions between a Bank Statement Creation at Bank process component and a Payment Processing process component.

FIG. 22 is a block diagram showing interactions between a Bank Statement Creation at Bank process component 2202 and a Payment Processing process component 2204 in the architectural design of FIG. 1.

As shown in FIG. 22, a bank statement is created at a bank and a Bank Statement Notification message 2206 is created. The Payment Processing process component 2204 receives the Bank Statement Notification message 2206 into the Bank Statement Processing In interface 2208 where a Create Bank Statement operation 2210 is invoked to create a bank statement in the Payment Processing process component 2204. A Maintain Bank Statement inbound process agent 2212 updates the Bank Statement business object 2214 with a new or modified bank statement. For example, the bank statement may be a statement for a house bank account where modifications are made when bills are paid.

Interactions between Process Components "Customer Invoice Processing and Due Item Processing"

Figure 23:
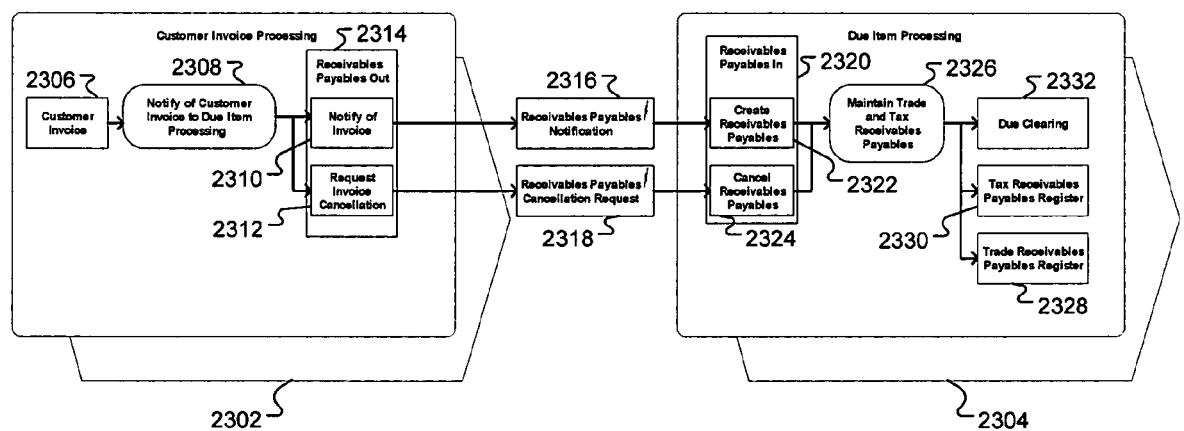
FIG. 23 is a block diagram showing interactions between a Customer Invoice Processing process component and a Due Item Processing process component.

FIG. 23 is a block diagram showing interactions between a Customer Invoice Processing process component 2302 and a Due Item Processing process component 2304 in the architectural design of FIG. 1.

The Customer Invoice Processing process component 2302 includes a Customer Invoice business object 2306 which is a document used to charge a customer for delivery of goods or services.

A Notify of Customer Invoice to Due Item Processing outbound process agent 2308 invokes a Notify of Invoice operation 2310 to inform the Due Item Processing process component 2304 about a customer invoice in order to derive payment due data. Alternatively, a Request Invoice Cancellation operation 2312 may be invoked to cancel the previously sent notification for receivables/payables due. Both operations 2310, 2312 may be used in a Receivables Payables Out interface 2314. If the Notify of Invoice operation 2310 is invoked, then a Receivables Payables Notification message 2316 is sent to the Due Item Processing process component 2304. If the Request Invoice Cancellation operation 2312 is invoked, the Receivables/Payables Cancellation Request message 2318 is sent to the Due Item Processing process component 2304.

The Receivables/Payables Messages are received by a Receivables/Payables In interface 2320 where operations may be performed. If the notification message 2316 is received, then a Create Receivables/Payables operation 2322 is performed to create a trade and/or tax receivable or payable. If the cancellation message 2318 is received, then a Cancel Receivables/Payables operation 2324 is performed to cancel a trade and/or tax receivable or payable. Cancellations and updates may be sent by a Maintain Trade and Tax Receivables Payables inbound process agent 2326 to one or more of three business objects: a Trade Receivables Payables business object 2328, a Tax Receivables Payables business object 2330, and a Due Clearing business object 2332. The Trade Receivables Payables business object 2328 may register for all trade receivables and payables from goods and services of a company from/to its business partners. The Tax Receivables Payables business object 2330 may register for all tax receivables and payables of a company that are due for delivered goods and rendered services between buyers and sellers, the consumption of goods, and the transfer of goods that are withheld from payments to vendors. The Due Clearing business object 2332 is group of receivables and payables for clearing. "Clearing" means that the amounts of the receivables and payables of a group balance to zero taking cash discounts and other deductions into account. The "group" is typically payments and invoices that belong together but it can also be credit memos and invoices, or customer and vendor invoices. A group results uniquely from the invoice reference information of a payment.

Interactions between Process Components "Logistics Execution Control" and "Outbound Delivery Processing"

Figure 24:
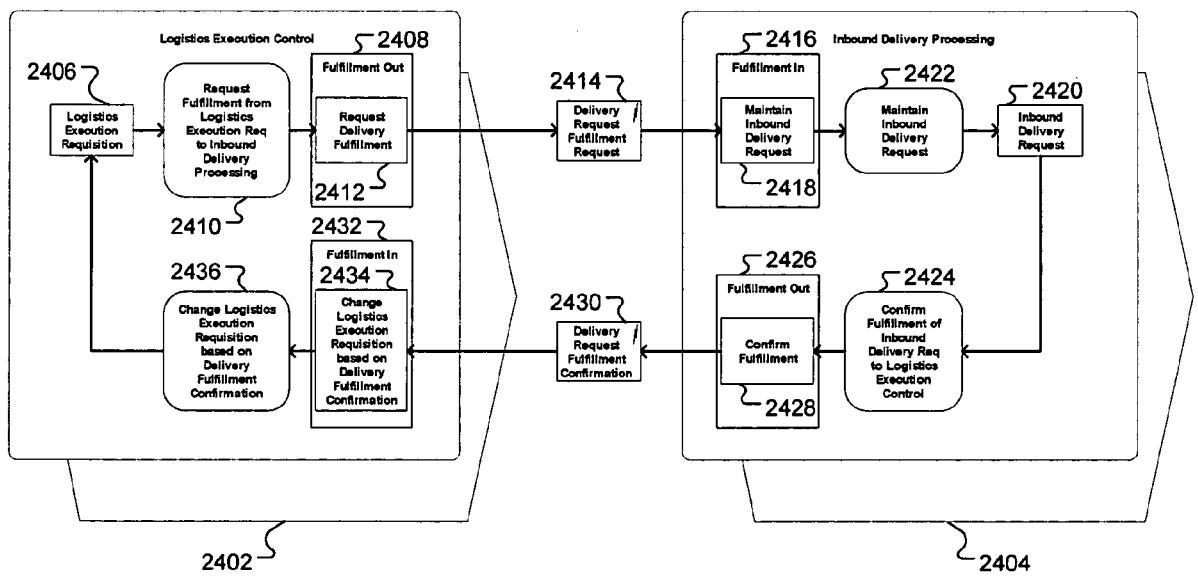
FIG. 24 is a block diagram showing interactions between a Logistics Execution Control process component and an Outbound Delivery Processing process component.

FIG. 24 is a block diagram showing interactions between a Logistics Execution Control process component 2402 and an Outbound Delivery Processing process component 2404 in the architectural design of FIG. 1.

The Logistics Execution Control process component 2402 controls and monitors, on a macro logistics level, the supply chain execution activities necessary for the fulfillment of an order. The Logistics Execution Control process component 2402 sends information to Logistics Execution to trigger the necessary supply chain execution activities, receives information about the supply chain execution progress, and updates data relevant for both fulfillment and supply and demand planning.

The Logistics Execution Control process component 2402 includes a Logistics Execution Requisition business object 2406 that sends data into a Fulfillment Out interface 2408 using a Request Fulfillment from Logistics Execution Request to Outbound Delivery Processing outbound process agent 2410. The Fulfillment Out interface 2408 includes a Request Delivery Fulfillment operation 2412 performed to maintain a delivery request The Logistics Execution Requisition business object 2406 may send instructions to Logistics Execution, which supports the controlling, triggering and monitoring of supply chain execution activities necessary for the fulfillment of an order.

A Delivery Fulfillment Request message 2414 is then transmitted to a Fulfillment In interface 2416 located in the Outbound Delivery Processing process component 2404. The interface contains a Maintain Outbound Delivery Request operation 2418, which receives delivery fulfillment requests from Logistics Execution Control and sends the requests into an Outbound Delivery Request business object 2420 using a Maintain Outbound Delivery Request inbound delivery process agent 2422. The Outbound Delivery Request business object 2420 is a document in the inbound delivery process containing all the relevant logistics data from the initiator of the inbound delivery process (such as the purchase order, for example). The inbound delivery request is used to validate an inbound delivery and an advanced shipping notification, and to prepare inbound logistics for receiving the goods. Upon receipt of the inbound delivery request, a Confirm Fulfillment of Outbound Delivery Request to Logistics Execution Control outbound delivery agent 2424 sends the confirmation data into a Fulfillment Out interface 2426 where a Confirm Fulfillment operation 2428 may take place. Upon completion of the Confirm Fulfillment operation 2428, a Delivery Fulfillment Confirmation message 2430 is created and transmitted back to the Logistics Execution Control process component 2402 to receive fulfillment confirmation data. Receiving the Delivery Fulfillment Confirmation message 2430 in the Logistics Execution Control process component 2402 may invoke a Change Logistics Execution Requisition based on the Delivery Fulfillment Confirmation operation 2434. The operation 2434 may then send updates or changes by way of a Change Logistics Execution Requisition based on Delivery Fulfillment inbound process agent 2436 into the Logistics Execution Requisition business object 2406.

Interactions between Process Components "Payment Processing" and "Accounting"

Figure 25:
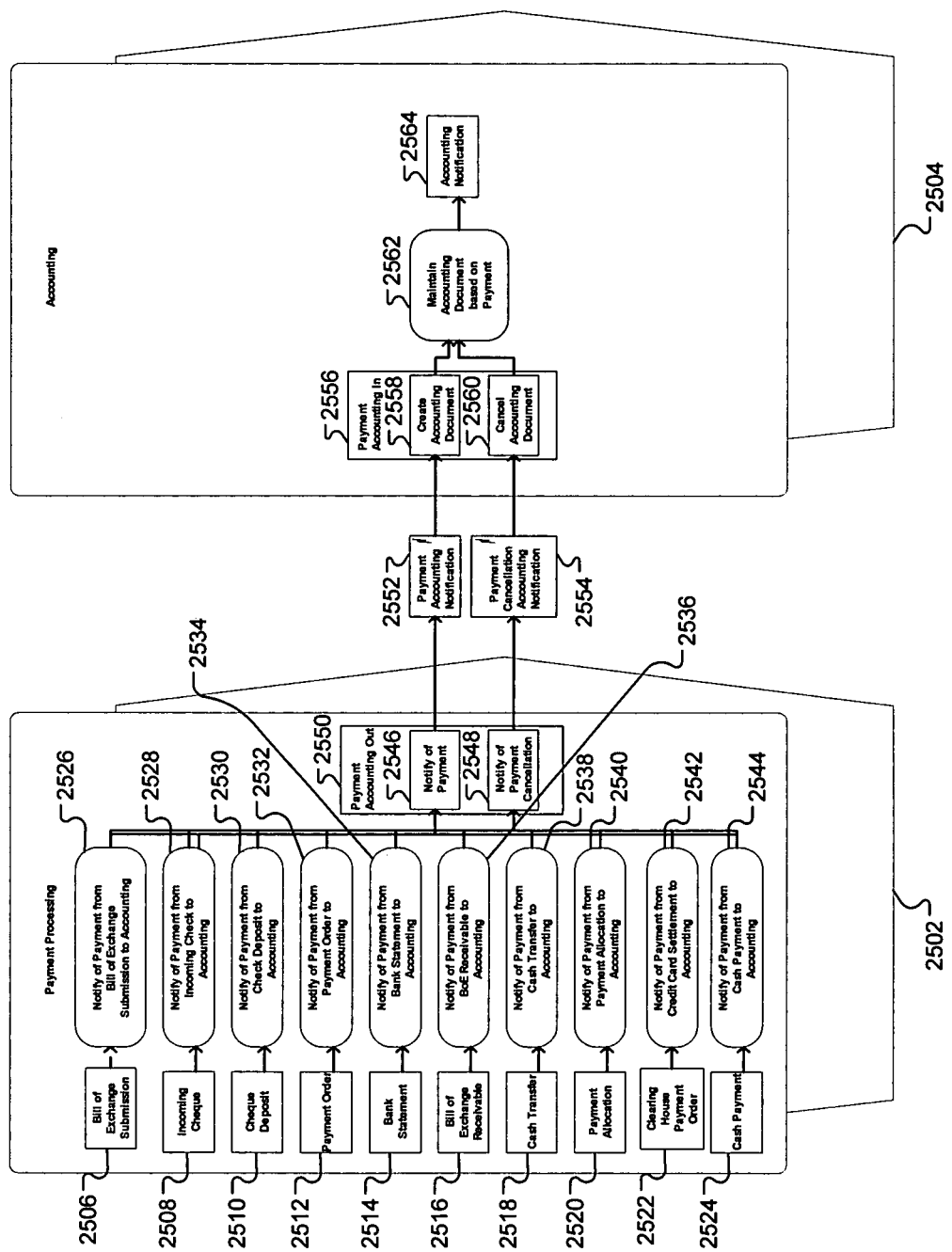
FIG. 25 is a block diagram showing interactions between a Payment Processing process component and an Accounting process component.

FIG. 25 is a block diagram showing interactions between a Payment Processing process component 2504 and an Accounting process component 2504 in the architectural design of FIG. 1.

The Payment Processing process component Payment Processing process component 2502 includes ten business objects: a Bill of Exchange Submission business object 2506, an Incoming Check business object 2508, a Check Deposit business object 2510, a Payment Order business object 2512, a Bank Statement business object 2514, a Bill of Exchange Receivable business object 2516, a Cash Transfer business object 2518, a Payment Allocation business object 2520, a Clearing House Payment Order business object 2522, and a Cash Payment business object 2524

The Bill of Exchange Submission business object 2506 sends incoming bill of exchange receivables to the house bank for cashing. The Incoming Check business object 2508 represents a check sent by a business partner. The incoming check will be sent to the house bank by a check deposit. The Check Deposit business object 2510 sends a collection of incoming checks to the house bank for cashing. The Payment Order business object 2512 creates payment media for either a bank, a credit card a settlement institute, or a business partner on the base of payment requests. The Bank Statement business object 2514 is a bank statement for a house bank account. The Bill of Exchange Receivable business object 2516 represents a Bill of Exchange received from a business partner or a Bill of Exchange Request sent to a business partner. The Cash Transfer business object 2518 is a document that shows an internal money transfer between: a bank account and bank account (bank transfer), a cash account and bank account (cash deposit), a bank account and cash account (cash withdrawal), or a cash account and cash account (cash transfer). The Payment Allocation business object 2520 documents a process step by which open payments of different types belonging to one another are indicated as confirmed or sent to other components for post processing. For example, an incoming check may confirm a payment advice or a bank statement item may confirm a check deposit. The Clearing House Payment Order business object 2522 is an order document for clearing a collection of credit card payments to the clearing house. The Cash Payment business object 2524 is a document showing an incoming or outgoing cash payment from or to a business partner.

The Payment Processing process component 2502 also contains a number of outbound process agents, each tied to a particular business object. The Notify of Payment from Bill of Exchange Submission to Accounting outbound process agent 2526 creates an accounting notification from the Bill of Exchange Submission business object 2506. The Notify of Payment from Incoming Check to Accounting outbound process agent 2528 may notify the Accounting process component 2504 of a bounced or cancelled check. The Notify of Payment from Check Deposit to Accounting outbound process agent 2530 may notify the Accounting process component 2504 of a change in status of a check deposit. For example, a notification may be sent stating that a deposit is ready for transfer to another account. The Notify of Payment from Payment Order to Accounting outbound process agent 2532 may notify the Accounting process component 2504 of a payment by payment order or a cancellation of payment. The Notify of Payment from Bank Statement to Accounting outbound process agent 2534 may notify the Accounting process component 2504 of a payment by bank account or a cancellation of payment. The Notify of Payment from Bill of Exchange Receivable to Accounting outbound process agent 2536 may notify the Accounting process component 2504 of a payment made by a bill of exchange or a cancellation of payment. The Notify of Payment from Cash Transfer to Accounting outbound process component 2538 may notify the Accounting process component 2504 about a transfer of money between house bank accounts and/or cash accounts or a cancellation of payment. The Notify of Payment from Payment Allocation to Accounting outbound process agent 2540 may notify the Accounting process component 2504 of a payment made by a payment allocation or a cancellation of payment. The Notify of Payment from Credit Card Settlement to Accounting outbound process agent 2542 may notify the Accounting process component 2504 of a payment made by credit card or a cancellation of payment. The Notify of Payment from Cash Payment to Accounting outbound process agent 2544 may notify the Accounting process component 2504 of a payment made by cash or a cancellation of payment.

The outbound process agents above may cause invocation of a Notify of Payment operation 2546 or a Request Payment Cancellation operation 2548 to update accounting. The operations 2546, 2548 may be included in a Payment Accounting Out interface 2550. The Payment Accounting Out interface 2550 may send a Payment Accounting Notification message 2552 or a Payment Accounting Cancellation Request message 2554 to a Payment Accounting In interface 2556 in the Accounting process component 2504. The Payment Accounting In interface 2556 includes a Create Accounting Document operation 2558 or a Cancel Accounting Document operation 2560 depending on the received message. A Maintain Accounting Document based on Payment inbound processing component 2562 updates an Accounting Notification business object 2564. The Accounting Notification business object 2564 is a common input channel for all kinds of operational business transactions into Financial Accounting that is called by operational components in order to record the business transactions in Financial Accounting.

Interactions between Process Components "Due Item Processing" and "Accounting"

Figure 26:
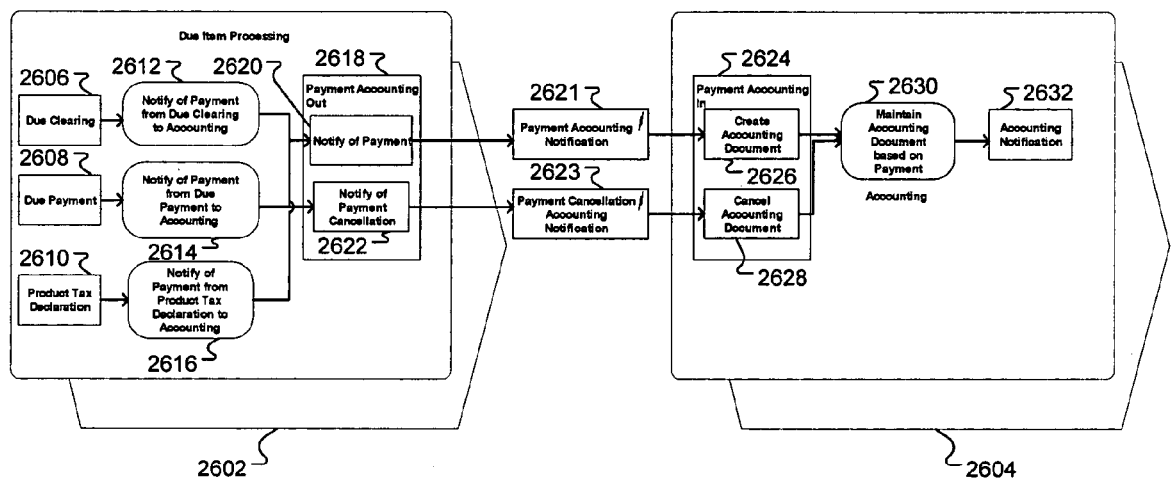
FIG. 26 is a block diagram showing interactions between a Due Item Processing process component and an Accounting process component.

FIG. 26 is a block diagram showing interactions between a Due Item Processing component 2602 and an Accounting process component 2604 in the architectural design of FIG. 1.

The Due Item Processing component 2602 contains three business objects: a Due Clearing business object 2606 to clear the amounts of the receivables and payables of a group balance to zero taking cash discounts and other deductions into account, a Due Payment business object 2608 to create payment requests for payment processing, and a Product Tax Declaration business object 2610 to declare the product tax liabilities/receivables of a company to the responsible tax authority according to the tax declaration arrangement and country specific legal requirements that triggers the payment to the tax authority.

The business objects send updates into one of three outbound process agents: a Notify of Payment from Due Clearing to Accounting 2612, which sends notification for a clearing of trade receivables and/or payables to Accounting, a Notify of Payment from Due Payment to Accounting 2614, which sends notification to Accounting for inward or outward trade receivables and/or payables payments, and a Notify of Payment from Product Tax Declaration to Accounting 2616, which sends notification for a payment of tax receivables and/or payables to Accounting.

A Payment Accounting Out interface 2618 includes a Notify of Payment operation 2620, which sends a Payment Accounting Notification message 2621 to the Accounting process component 2604 notifying Financial Accounting about inward or outward movements of trade or tax receivables or payables. Alternatively, a Request Payment Cancellation operation 2622 is invoked that sends a Payment Accounting Cancellation Request message 2623 to the Accounting process component 2604 to notify a cancelling of an inward or outward movement of trade or tax receivables or payables in Financial Accounting.

The Accounting process component 2604 receives the messages in a Payment Accounting In interface 2624, which includes a Create Accounting Document operation 2626 to receive Payment Accounting Notification from Payment Processing or Due Item Processing. If the received message was the cancellation message 2623, a Cancel Accounting Document operation 2628 is invoked to cancel the payment processing or due item processing. Updates are sent to the Accounting Notification business object using a Maintain Accounting Document 2632 based on Payment inbound process agent 2630. An Accounting Notification business object 2632 is a common input channel for all kinds of operational business transactions into Financial Accounting that is called by operational components in order to record the business transactions in Financial Accounting.

Interactions between Process Components "Service Order Processing" and "Customer Requirement Processing"

Figure 27:
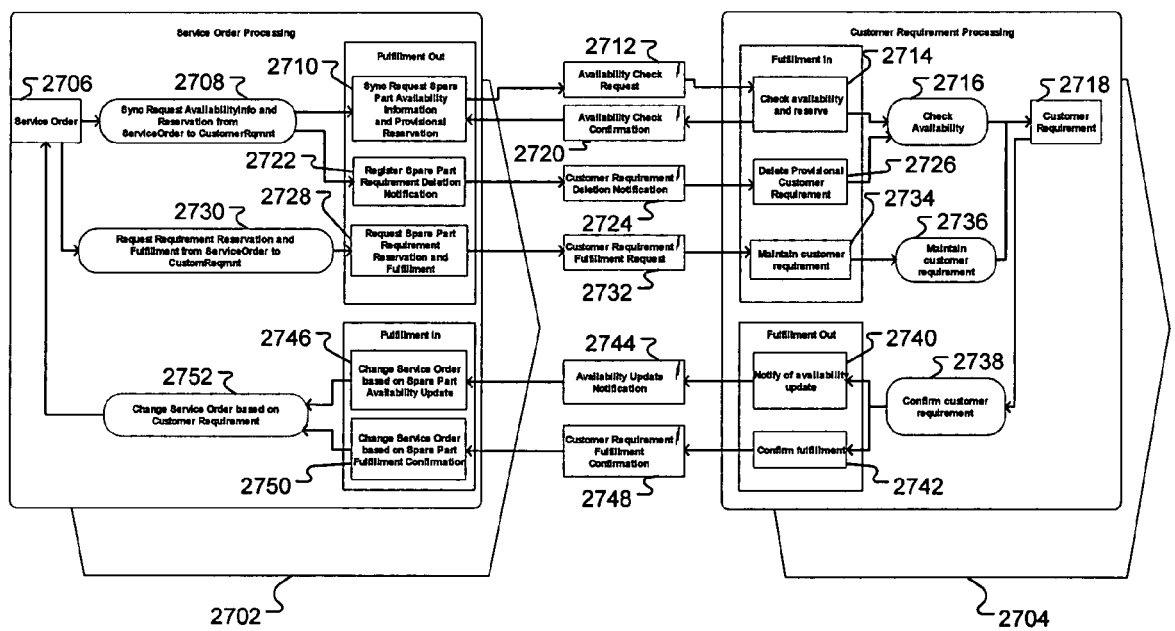
FIG. 27 is a block diagram showing the interactions between a Service Order Processing process component and a Customer Requirement Processing process component.

FIG. 27 is a block diagram showing interactions between a Service Order Processing process component 2702 and a Customer Requirement Processing process component 2704 in the architectural design of FIG. 1.

The Service Order Processing process component 2702 contains a Service Order business object 2706, inbound and outbound processing agents and several operations. The Service Order business object 2706 represents customer orders to service providers for the delivery of services which can possibly include the exchange of spare parts in an after sales scenario. The Service Order business object 2706 initiates one of four operations to send or request information to the Customer Requirement Processing process component 2704.

The Service Order business object 2706 may send a request to fulfill a service order to the Sync Request Availability Information and Reservation from Service Order to Customer Requirement outbound process agent 2708. Here, the process agent 2708 may invoke a Sync Request Spare Part Availability Information and Provisional Reservation operation 2710 that requests availability information including the creation of a provisional reservation for service order spare part items operation. Upon completion of the operation 2710, the operation 2710 transmits an Availability Check Request message 2712. The Availability Check Request message 2712 is received by a Check Availability and Reserve operation 2714 that checks the availability of certain amounts of materials and confirms this availability to the caller. The process agent 2716 updates the Customer Requirement business object 2718 to complete the operation 2714. In addition, an Availability Check Confirmation message 2720 may be transmitted back to the Service Order Processing process component 2702.

The Service Order business object 2706 may also send a notification to a Register Spare Part Requirement Deletion Notification operation 2722 that registers provisional spare part requirement reservation for deletion. The operation 2722 also triggers deletion in case of failure or cancellation of transaction processing. This operation 2722 generates a Customer Requirement Deletion Notification message 2724 and is received in a Delete Provisional Customer Requirement operation 2726. The Delete Provisional Customer Requirement operation 2726 deletes provisional customer requirements that have been created by the "sync check availability and reserve" operation. An update may be sent to the Customer Requirement business object 2718 using the Check Availability inbound process agent 2716.

The Service Order business object 2706 may also send a request to a Request Spare art Requirement Reservation and Fulfillment operation 2728 using a Request Requirement Reservation and fulfillment from Service Order to Customer Requirement outbound process agent 2730. The Request Spare Part Requirement Reservation and Fulfillment operation 2728 requests fulfillment planning and fulfillment execution for service order spare part items. A Customer Requirement Fulfillment Request message 2732 is generated and transmitted to a Maintain Customer Requirement operation 2734 that creates or changes a customer requirement. An update may be sent to a Customer Requirement business object 2718 using the Maintain Customer Requirement inbound process agent 2736.

The Customer Requirement business object 2718 is derived from a sales order or quotation for which details on the anticipated availability date are added. The Customer Requirement business object 2718 sends information or notifications to the Service Order Processing process component 2702 using a Confirmation Customer Requirement outbound process agent 2738. The process agent 2738 invokes a Notify of availability update operation 2740 which notifies the creator of a customer requirement about an updated availability situation for the products requested within the customer requirement. The process agent 2738 may also invoke a Confirm Fulfillment operation 2742 that confirms the partial or complete fulfillment of a customer requirement to the creator of the requirement. If the Notify of availability update operation 2740 is invoked, an Availability Update Notification message 2744 may be generated and transmitted to a Change Service Order based on Spare Part Availability Update operation 2746 to update a service order with spare part availability and reservation information based on customer requirement fulfillment planning data. If the Confirm Fulfillment operation 2742 is invoked, a Customer Requirement Fulfillment Confirmation message 2748 may be generated and transmitted to a Change Service Order based on Spare Part Fulfillment Confirmation operation 2750 that updates a service order with spare part quantity delivered to customer or picked up by service technician. A change Service Order based on Customer Requirement inbound process agent 2752 may then update the Service Order business object 2706.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising application software encoded on a tangible machine-readable information carrier, the application software being structured as process components interacting with each other through service interfaces, the software comprising:

a plurality of process components, each of the process components being a package of software implementing a respective and distinct business process, the plurality of process components including:

an Outbound Delivery process component that combines tasks concerning outbound delivery processes and enables communication with a vendor;

a Site Logistics Processing process component that supports preparation and execution tasks concerning internal inventory movement in a warehouse type environment;

a Confirmation and Inventory process component that combines tasks required to confirm inventory changes and provided activities;

a Customer Requirement Processing process component that combines tasks required for processing customer requirements and provides an interface to pre-sales, sales and services, and receives the customer requirements, prepares them and passes them on as supply planning requirements;

a Supply and Demand Matching process component that combines tasks necessary to ensure that sufficient material receipt elements exist to cover material demand;

a Logistics Execution Control process component that controls and monitors the supply chain execution activities necessary for the fulfillment of an order;

a Service Request Processing process component that covers requests from a customer to a service provider to answer a question or solve a problem about a product that the customer possesses;

a Customer Quote Processing process component that offers a customer a binding delivery of goods or services according to fixed terms;

a Service Order Processing process component that deals with short-term agreements between a customer and a service provider, in which the customer orders one-off services;

a Service Contract process component that deals with long-term agreements between a customer and a service provider, specifying the scope of services and general conditions used for processing service requests and service orders; and a Service Confirmation Processing process component that deals with services rendered for a service order; and a plurality of service interface operations, each service interface operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:

the Customer Quote Processing process component and the Customer Requirement Processing process component;

the Service Confirmation Processing process component and the Confirmation and Inventory process component;

the Service Request Processing process component and the Service Request Processing in External Provider System process component;

the Logistics Execution Control process component and the Site Logistics Processing process component;

the Service Request Processing External Requester System process component and the Service Request Processing process component;

the Logistics Execution Control process component and the Outbound Delivery Processing process component; and the Service Order Processing process component and the Customer Requirement Processing process component.

2. The product of claim 1, wherein the plurality of process components further includes:

an Accounting process component that records all relevant business transactions;

a Due Item Processing process component that is used to manage all payables, receivables from service and supply and corresponding sales including a withholding tax;

a Payment Processing process component that is used to handle all incoming and outgoing payments as well as represent the main database for a liquidity status; and a Customer Invoice Processing process component that is used to charge a customer for the delivery of goods or services;

and wherein the pair-wise interactions between pairs of the process components further include interactions between:

the Service Confirmation Processing process component and the Customer Invoice Processing process component;

the Payment Processing at Business Partner process component and the Payment Processing process component;

the Service Order Processing process component and the Customer Invoice Processing process component;

the Confirmation and Inventory process component and the Accounting process component;

the Payment Processing process component and the Payment Order processing at house bank process component;

the Service Confirmation Processing process component and the Accounting process component;

the Site Logistics Processing process component and the Accounting process component;

the Customer Invoice Processing process component and the Accounting process component;

the Service Order Processing process component and the Accounting process component;

the Due Item Processing process component and the Payment Processing process component;

the Payment Processing process component and the Processing at Business Partner process component;

the Service Request Processing process component and the Accounting process component;

the Payment Processing process component and the Due Item Processing process component;

the Customer Invoice Processing process component and the Supplier Invoice Processing at Customer process component;

the Bank Statement Creation at Bank process component and the Payment Processing process component;

the Customer Invoice Processing process component and the Due Item Processing process component;

the Payment Processing process component and the Accounting process component;

the Due Item Processing component and the Accounting process component; and the Service Request Processing process component and the Customer Invoice Processing process component.

3. The product of claim 2, wherein:

each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

4. The product of claim 3, wherein the deployment units comprise:

a Financial Accounting deployment unit that includes the Accounting process component;

a Logistics Execution deployment unit that includes the Outbound Delivery process component, the Site Logistics Processing process component and the Confirmation and Inventory process component;

a Supply Chain Control deployment unit that includes the Customer Requirement Processing process component, the Supply and Demand Matching process component, and the Logistics Execution Control process component;

a Due Item Management deployment unit that includes the Due Item Processing process component;

a Payment deployment unit that includes the Payment Processing process component;

a Customer Invoice deployment unit that includes the Customer Invoice Processing process component; and a Customer Relationship Management deployment that includes the Service Request Processing process component, the Customer Quote Processing process component, the Service Order Processing process component, the Service Contract process component, and the Service Confirmation Processing process component.

5. The product of claim 1, wherein:

each of the process components includes one or more business objects; and none of the business objects of any one of the process components interacts directly with any of the business objects included in any of the other process components.

6. The product of claim 5, wherein the business objects comprise a business process object.

7. The product of claim 5, wherein:

none of the business objects included in any one of the process components is included in any of the other process components.

8. The product of claim 1, further comprising:

a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component.

9. The product of claim 8, wherein:
the inbound process agents comprise a first inbound process agent operable to start the execution of step requested in a first inbound message by creating or updating one or more business object instances.

10. The product of claim 8, wherein:
the outbound process agents comprise a first asynchronous outbound process agent that is called after a business object that is associated with the first outbound process agent changes.

11. The product of claim 1, wherein the operations comprise synchronous and asynchronous operations.

12. A system, comprising:
a computer system comprising one or more hardware platforms for executing a computer software application;
a plurality of process components, each of the process components being a package of software implementing a respective and distinct business process, the plurality of process components including:
an Outbound Delivery process component that combines tasks concerning outbound delivery processes and enables communication with a vendor;
a Site Logistics Processing process component that supports preparation and execution tasks concerning internal inventory movement in a warehouse type environment;
a Confirmation and Inventory process component that combines tasks required to confirm inventory changes and provided activities;
a Customer Requirement Processing process component that combines tasks required for processing customer requirements and provides an interface to pre-sales, sales and services, and receives the customer requirements, prepares them and passes them on as supply planning requirements;
a Supply and Demand Matching process component that combines tasks necessary to ensure that sufficient material receipt elements exist to cover material demand;
a Logistics Execution Control process component that controls and monitors the supply chain execution activities necessary for the fulfillment of an order;
a Service Request Processing process component that covers requests from a customer to a service provider to answer a question or solve a problem about a product that the customer possesses;
a Customer Quote Processing process component that offers a customer a binding delivery of goods or services according to fixed terms;
a Service Order Processing process component that deals with short-term agreements between a customer and a service provider, in which the customer orders one-off services;
a Service Contract process component that deals with long-term agreements between a customer and a service provider, specifying the scope of services and general conditions used for processing service requests and service orders; and
a Service Confirmation Processing process component that deals with services rendered for a service order; and a plurality of service interface operations, each service interface operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:
the Customer Quote Processing process component and the Customer Requirement Processing process component;
the Service Confirmation Processing process component and the Confirmation and Inventory process component;
the Service Request Processing process component and the Service Request Processing in External Provider System process component;
the Logistics Execution Control process component and the Site Logistics Processing process component;
the Service Request Processing External Requester System process component and the Service Request Processing process component; and
the Logistics Execution Control process component and the Outbound Delivery Processing process component; and
the Service Order Processing process component and the Customer Requirement Processing process component.

13. The system of claim 12, wherein:
each of the process components includes one or more business objects; and
none of the business objects of any one of the process components interacts directly with any of the business objects included in any of the other process components.

14. The system of claim 12, wherein:
none of the business objects included in any one of the process components is included in any of the other process components.

15. The system of claim 12, wherein:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component.

16. The system of claim 12, the system comprising multiple hardware platforms, wherein:
the Outbound Delivery process component, the Site Logistics Processing process component and the Confirmation and Inventory process component are deployed on a first hardware platform;
the Customer Requirement Processing process component, the Supply and Demand Matching process component, and the Logistics Execution Control process component are deployed on a second hardware platform; and
the Service Request Processing process component, the Customer Quote Processing process component, the Service Order Processing process component, the Service Contract process component, and the Service Confirmation Processing process component are deployed on a third hardware platform.

17. The system of claim 16, wherein each of the first through the third hardware platforms are distinct and separate from each other.

18. A method for developing a computer software application, comprising:

obtaining in a computer system digital data representing an architectural design for a set of processes implementing an end-to-end application process, the design specifying a process component for each process in the set of processes, the design specifying further specifying a set of process component interactions, wherein the specified process components include an Outbound Delivery process component that combines tasks concerning outbound delivery processes and enables communication with a vendor;

a Site Logistics Processing process component that supports preparation and execution tasks concerning internal inventory movement in a warehouse type environment;

a Confirmation and Inventory process component that combines tasks required to confirm inventory changes and provided activities;

a Customer Requirement Processing process component that combines tasks required for processing customer requirements and provides an interface to presales, sales and services, and receives the customer requirements, prepares them and passes them on as supply planning requirements;

a Supply and Demand Matching process component that combines tasks necessary to ensure that sufficient material receipt elements exist to cover material demand;

a Logistics Execution Control process component that controls and monitors the supply chain execution activities necessary for the fulfillment of an order;

a Service Request Processing process component that covers requests from a customer to a service provider to answer a question or solve a problem about a product that the customer possesses;

a Customer Quote Processing process component that offers a customer a binding delivery of goods or services according to fixed terms;

a Service Order Processing process component that deals with short-term agreements between a customer and a service provider, in which the customer orders one-off services;

a Service Contract process component that deals with long-term agreements between a customer and a service provider, specifying the scope of services and general conditions used for processing service requests and service orders; and a Service Confirmation Processing process component that deals with services rendered for a service order; and wherein the process component interactions include interactions between the Customer Quote Processing process component and the Customer Requirement Processing process component;

the Service Confirmation Processing process component and the Confirmation and Inventory process component;

the Service Request Processing process component and the Service Request Processing in External Provider System process component;

the Logistics Execution Control process component and the Site Logistics Processing process component;

the Service Request Processing External Requester System process component and the Service Request Processing process component; and the Logistics Execution Control process component and the Outbound Delivery Processing process component; and the Service Order Processing process component and the Customer Requirement Processing process component; and using the design including the specified process components and the specified process component interactions to develop a computer software application to perform the set of processes.

19. The method of claim 18, wherein:

each process in the set of processes is a business process transforming a defined business input into a defined business outcome.

20. The method of claim 19, wherein:

obtaining digital data representing the architectural design further comprises editing the design before using the design.

\* \* \* \* \*